US009971626B2

(12) United States Patent
Busaba et al.

(10) Patent No.: US 9,971,626 B2
(45) Date of Patent: *May 15, 2018

(54) COHERENCE PROTOCOL AUGMENTATION TO INDICATE TRANSACTION STATUS

(71) Applicant: International Business Machines Corporation, Armonk, NY (US)

(72) Inventors: Fadi Y. Busaba, Poughkeepsie, NY (US); Harold W. Cain, III, Raleigh, NC (US); Michael K. Gschwind, Chappaqua, NY (US); Christian Jacobi, Poughkeepsie, NY (US); Valentina Salapura, Chappaqua, NY (US); Eric M. Schwarz, Gardiner, NY (US); Timothy J. Slegel, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 38 days.

This patent is subject to a terminal disclaimer.

(21) Appl. No.: 14/501,875

(22) Filed: Sep. 30, 2014

(65) Prior Publication Data
US 2015/0261564 A1 Sep. 17, 2015

Related U.S. Application Data

(63) Continuation of application No. 14/212,217, filed on Mar. 14, 2014.

(51) Int. Cl.
*G06F 9/46* (2006.01)
*G06F 12/0815* (2016.01)
(Continued)

(52) U.S. Cl.
CPC .......... *G06F 9/466* (2013.01); *G06F 9/30087* (2013.01); *G06F 9/3834* (2013.01);
(Continued)

(58) Field of Classification Search
CPC . G06F 12/0815; G06F 12/0828; G06F 12/084
See application file for complete search history.

(56) References Cited

U.S. PATENT DOCUMENTS 5,657,474 A 8/1997 Paul Dubois Taine et al.
6,081,874 A * 6/2000 Carpenter ........... G06F 12/0813
711/118

(Continued)

FOREIGN PATENT DOCUMENTS

EP 835488 B1 4/1998

OTHER PUBLICATIONS

International Search Report and the Written Opinion of International Application No. PCT/EP2015/055019; Filing Date: Mar. 11, 2015; dated Jul. 2, 2015; pp. 1-11.
(Continued)

*Primary Examiner* — Ann J Lo
*Assistant Examiner* — Leandro R Villanueva
(74) *Attorney, Agent, or Firm* — Cantor Colburn LLP; Steven Chiu

(57) ABSTRACT

Embodiments relate to implementing a coherence protocol. An aspect includes sending a request for data to a remote processor and receiving by a processor a response from the remote processor. The response has a transaction status of a remote transaction on the remote processor. The processor adds the transaction status of the remote transaction on the remote processor in a local transaction interference tracking table.

7 Claims, 17 Drawing Sheets

(51) Int. Cl.
*G06F 9/30* (2018.01)
*G06F 9/38* (2018.01)

(52) U.S. Cl.
CPC ........ *G06F 9/3859* (2013.01); *G06F 12/0815* (2013.01); *G06F 2212/621* (2013.01)

(56) References Cited

U.S. PATENT DOCUMENTS

| | | | |
|---|---|---|---|
| 6,349,361 B1 | 2/2002 | Altman et al. | |
| 6,484,240 B1 | 11/2002 | Cypher et al. | |
| 6,567,839 B1* | 5/2003 | Borkenhagen | G06F 9/3009 712/205 |
| 6,697,935 B1* | 2/2004 | Borkenhagen | G06F 9/3851 712/228 |
| 7,398,355 B1 | 7/2008 | Moir et al. | |
| 7,421,544 B1 | 9/2008 | Wright et al. | |
| 2001/0052054 A1 | 12/2001 | Franke et al. | |
| 2004/0068622 A1 | 4/2004 | Van Doren et al. | |
| 2007/0239915 A1* | 10/2007 | Saha | G06F 9/526 710/200 |
| 2010/0138841 A1 | 6/2010 | Dice et al. | |
| 2010/0332721 A1 | 12/2010 | Yamada et al. | |
| 2011/0029490 A1* | 2/2011 | Agarwal | G06F 9/467 707/684 |
| 2011/0119452 A1* | 5/2011 | Heller, Jr. | G06F 9/467 711/147 |
| 2011/0145304 A1 | 6/2011 | Gray et al. | |
| 2012/0227045 A1* | 9/2012 | Knauth | G06F 9/3863 718/100 |
| 2013/0097607 A1* | 4/2013 | Lewis | G06F 9/4843 718/102 |
| 2013/0159653 A1* | 6/2013 | Pohlack | G06F 9/528 711/163 |
| 2013/0339962 A1* | 12/2013 | Greiner | G06F 9/466 718/101 |
| 2014/0040551 A1 | 2/2014 | Blainey et al. | |
| 2015/0261676 A1* | 9/2015 | Busaba | G06F 12/0815 711/144 |

OTHER PUBLICATIONS

A. McDonald, "Architectures for Transactional Memory," A Dissertation submitted to the Department of Computer Science and the Committee on Graduate Studies of Stanford University; Jun. 2009; pp. 1-161.

A. Mendelson, et al., "The "T" Enhancement of Cache Coherent Protocols," citesserx.ist.psu.edu/viewdoc/download?doi=10.1.1.30.9171.pdf . . . ; 1995; pp. 1-9.

A. Negi, et al., "pi-TM: Pessimistic Invalidation for Scalable Lazy Hardware Transactional Memory", Proceedings 2011 International Conference on Parallel Architectures and Compilation Techniques (PACT); pp. 203-204, IEEE. 2011.

B. Ciciani, et al., "Balanced Control Protocol for Hybrid Database System," IP.com No. IPCOMM000034582D, Original Publication Date: Mar. 1, 1989; IP.com Electronic Publication: Jan. 27, 2005.

C. Jacobi, et al., "Transactional Memory Architecture and Implementation for IBM System z," 2012 IEEE/ACM 45th Annual International Symposium on Microarchitecture; pp. 25-36.

IBM, "Power ISA User Instructions Set Architecture," Version 2.07 published May 22, 2013; pp. 1-1496 (submitted in seven separate parts).

IBM, "z/Architecture: Principles of Operation," SA22-7232-08; Tenth Edition (Sep. 2012); pp. 1-1568 (submitted in two separate parts).

Intel, "Intel Architecture Instruction Set Extensions Programming Reference," 319433-012A; Feb. 2012; pp. 1-598.

M. Lupon, et al., "Fas™: A Log-Based Hardware Transactional Memory with Fast Abort Recovery," 2009 18th International Conference on Parallel Architectures and Compilation Techniques (PACT 2009); pp. 293-302, IEEE; 2009.

P. Mak, et al., "IBM System z10 Processor Cache Subsystem Microarchitecture," IBM J. Res. & Dev. vol. 53., No. 1., paper 2; 2009; pp. 1-12.

S. Nakshatra, et al., "Computer Architecture: Cache Coherence Protocols," meseec.ce.rit.edu/551projects/Fall2010/1-3; 2010; pp. 1-25.

\* cited by examiner

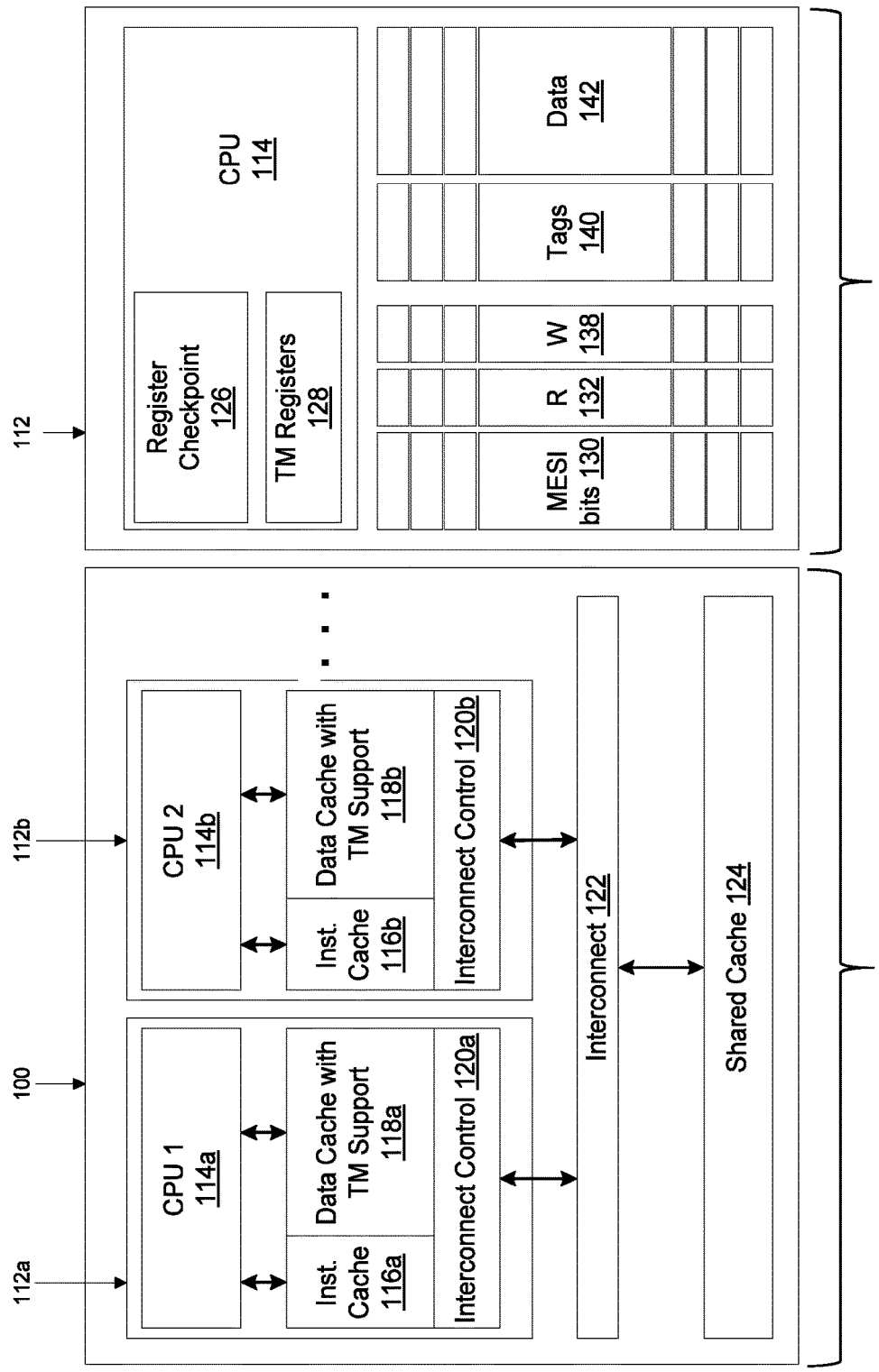

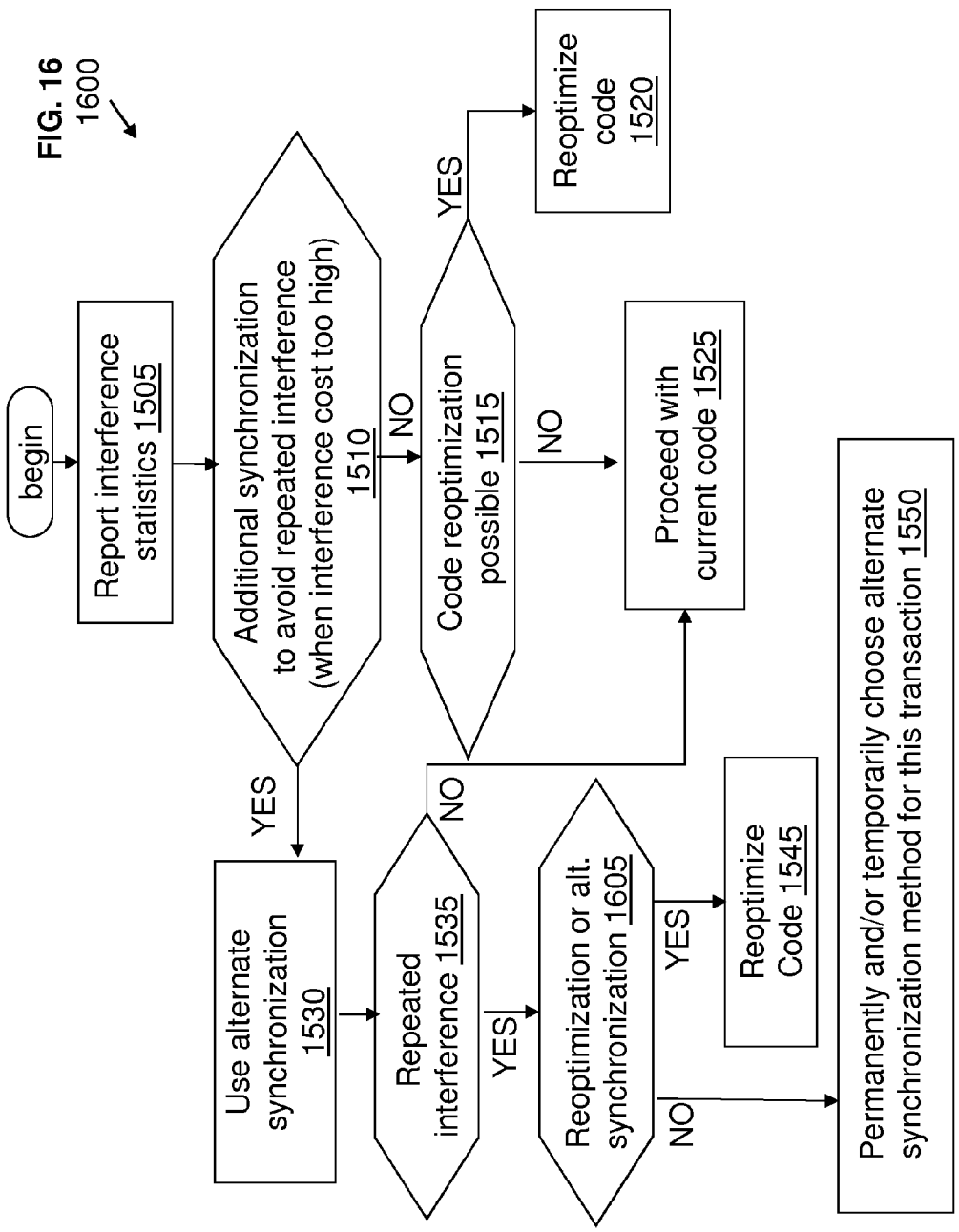

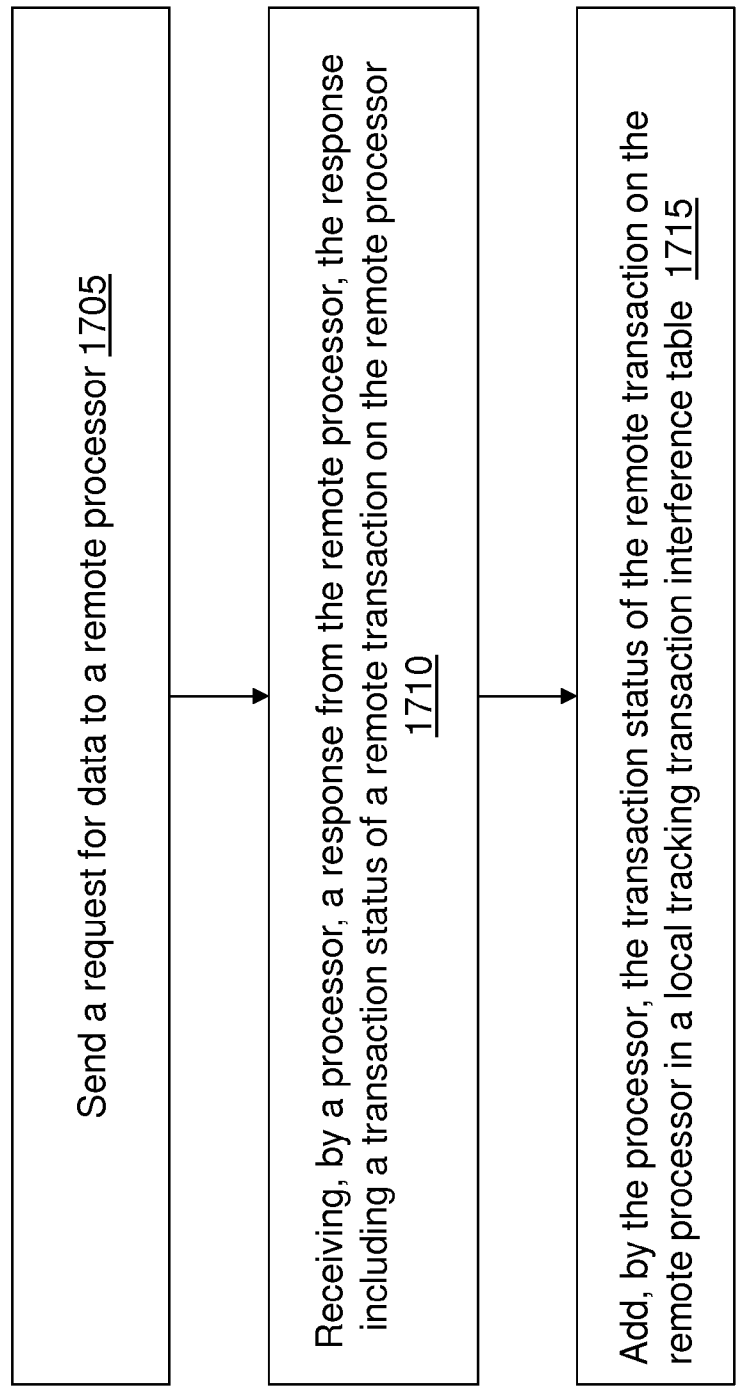

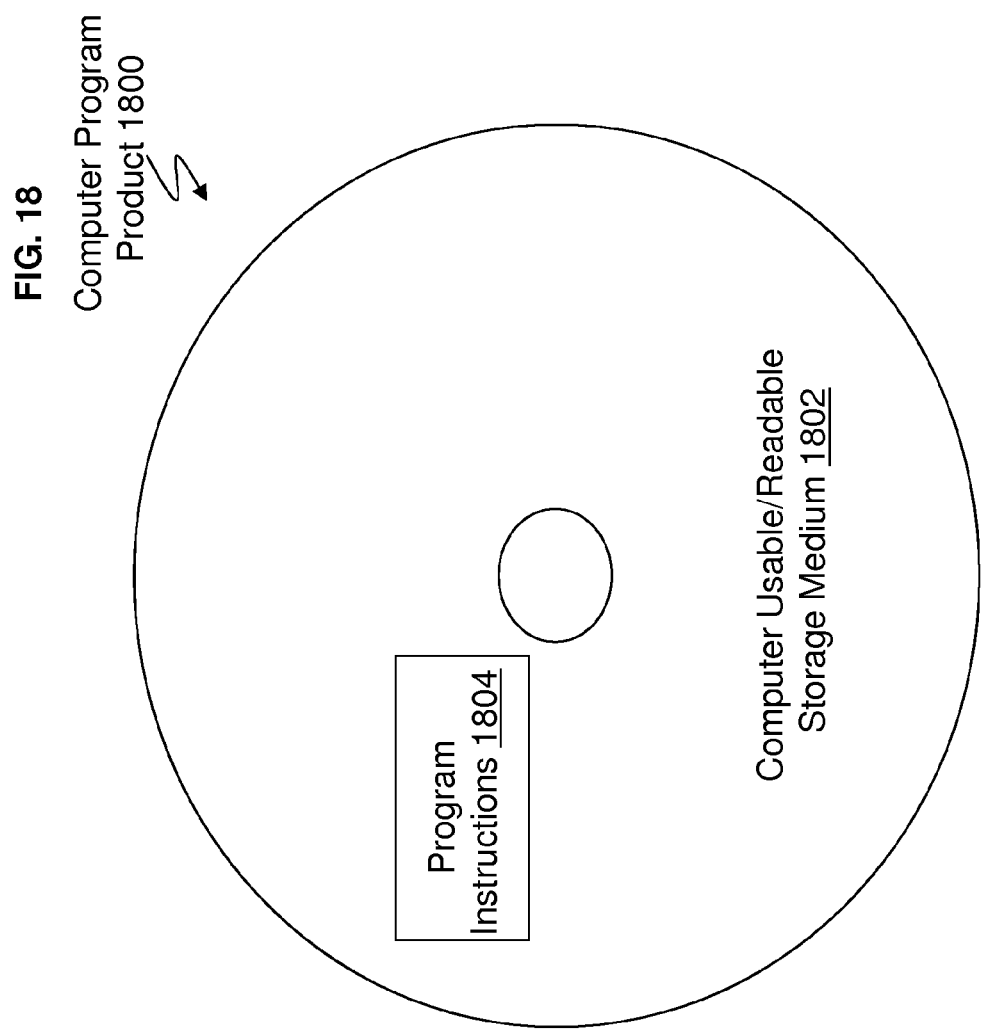

COHERENCE PROTOCOL AUGMENTATION TO INDICATE TRANSACTION STATUS

This application is a continuation of U.S. application Ser. No. 14/212,217, filed on Mar. 14, 2014, which is herein incorporated by reference in its entirety.

BACKGROUND

The present invention relates generally to request and response protocols, and more specifically, to coherence protocol augmentation to indicate transaction status.

The number of central processing unit (CPU) cores on a chip and the number of CPU cores connected to a shared memory continues to grow significantly to support growing workload capacity demand. The increasing number of CPUs cooperating to process the same workloads puts a significant burden on software scalability; for example, shared queues or data-structures protected by traditional semaphores become hot spots and lead to sub-linear n-way scaling curves. Traditionally this has been countered by implementing finer-grained locking in software, and with lower latency/higher bandwidth interconnects in hardware. Implementing fine-grained locking to improve software scalability can be very complicated and error-prone, and at today's CPU frequencies, the latencies of hardware interconnects are limited by the physical dimension of the chips and systems, and by the speed of light.

Hardware transactional memory (HTM, or in this discussion, simply TM) has been introduced, wherein a group of instructions—called a transaction—operate in an atomic manner on a data structure in memory, as viewed by other central processing units (CPUs) and the I/O subsystem (atomic operation is also known as block concurrent or serialized in other literature). The transaction executes optimistically without obtaining a lock, but may need to abort and retry the transaction execution if an operation, of the executing transaction, on a memory location conflicts with anther operation on the same memory location. Previously, software transactional memory implementations have been proposed to support software Transactional Memory (TM).

SUMMARY

Embodiments include a system for implementing a coherence protocol. A request for data is sent to a remote processor. A processor receives a response from the remote processor, and the response has a transaction status of a remote transaction on the remote processor. The processor adds the transaction status of the remote transaction on the remote processor in a local transaction interference tracking table.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

FIG. 1 depicts a schematic block diagram of an example multiple processor (CPU)/core Transactional Memory environment in accordance with an embodiment;

FIG. 2 depicts a schematic block diagram illustrating a transactional processor in accordance with an embodiment;

FIG. 16 depicts a flow diagram illustrating how the processor responds to interference indication in the local tracking transaction interference storage table in accordance with an embodiment;

FIG. 17 depicts a method for coherence protocol handling in accordance with an embodiment; and FIG. 18 depicts a computer-readable medium according to an embodiment.

DETAILED DESCRIPTION

Figure 3:
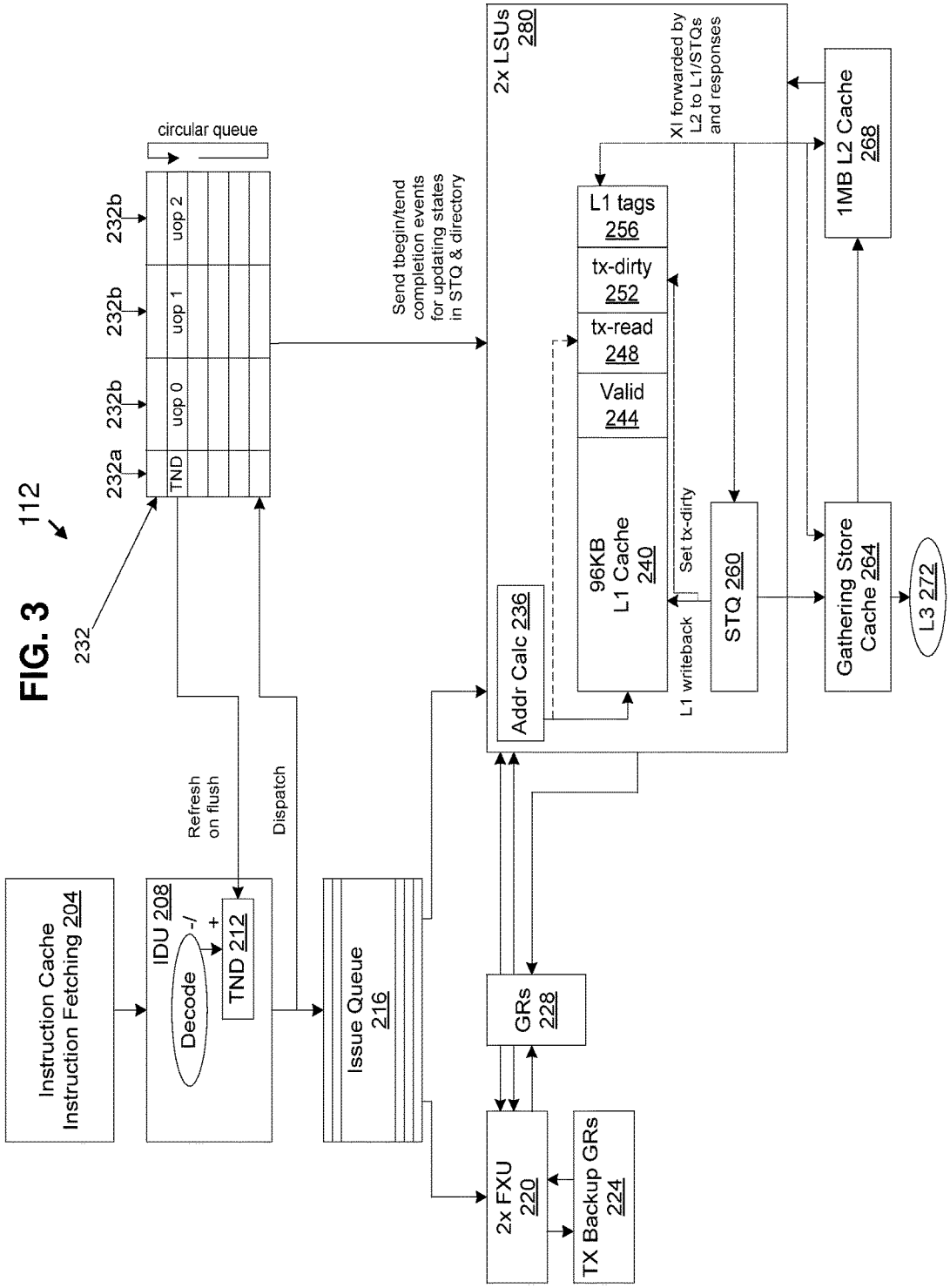
FIG. 3 depicts a schematic block diagram of exemplary components of a transactional processor (CPU) shown in FIGS. 1 and 2, in accordance with an embodiment.

Multiprocessor systems use coherence protocols to maintain the consistency between all the caches in a system of distributed shared memory. When a request for data from a certain cache is made, the cache issues the data and updates its status that it does not have the data any more, or that the data are not exclusively held. If a processor is in a transactional execution, and the data from its cache are requested which are a part of the transaction, the processor will abort the transaction, and send the data.

No information is provided whether a request has caused another transaction to abort. In some instances, it will be desirable to notify the original requestor whether a request impacted another transaction, to provide feedback and allow the originator of the requestor to adapt its execution, e.g., to detect livelock scenarios and address other performance degrading scenarios.

According to embodiment, coherence protocol is extended to include additional information about the transaction status. When a processor is in transactional execution, a coherence request can cause its execution to abort, for example, because the data is part of the transaction read or write set, and a conflict is detected. The coherence protocol request is extended with additional information that it (processor receiving the coherence request) aborted a transaction during the transactional execution according to embodiments.

"Power ISA™ Version 2.07 published May 22, 2013 from IBM® and incorporated by reference herein in its entirety teaches an example reduced instruction set computer (RISC) instruction set architecture (ISA)". Also, "z/Architecture Principles of Operation" SA22-7832-09 (August, 2012) from IBM® and incorporated by reference herein in its entirety teaches an example CISC (complex instruction set computer) instruction set architecture").

Historically, a computer system or processor had only a single processor (aka processing unit or central processing unit). The processor included an instruction processing unit (IPU), a branch unit, a memory control unit and the like. Such processors were capable of executing a single thread of a program at a time. Operating systems were developed that could time-share a processor by dispatching a program to be executed on the processor for a period of time, and then dispatching another program to be executed on the processor for another period of time. As technology evolved, memory subsystem caches were often added to the processor as well as complex dynamic address translation including translation lookaside buffers (TLBs). The IPU itself was often referred to as a processor. As technology continued to evolve, an entire processor, could be packaged an a single semiconductor chip or die, such a processor was referred to as a microprocessor. Then processors were developed that incorporated multiple IPUs, such processors were often referred to as multi-processors. Each such processor of a multi-processor computer system (processor) may include individual or shared caches, memory interfaces, system bus, address translation mechanism and the like. Virtual machine and instruction set architecture (ISA) emulators added a layer of software to a processor, that provided the virtual machine with multiple "virtual processors" (aka processors) by time-slice usage of a single IPU in a single hardware processor. As technology further evolved, multi-threaded processors were developed, enabling a single hardware processor having a single multi-thread IPU to provide a capability of simultaneously executing threads of different programs, thus each thread of a multi-threaded processor appeared to the operating system as a processor. As technology further evolved, it was possible to put multiple processors (each having an IPU) on a single semiconductor chip or die. These processors were referred to processor cores or just cores. Thus the terms such as processor, central processing unit, processing unit, microprocessor, core, processor core, processor thread, thread for example are often used interchangeably. Aspects of embodiments herein may be practiced by any or all processors including those shown supra, without departing from the teachings herein. Wherein the term "thread" or "processor thread" is used herein, it is expected that particular advantage of the embodiment may be had in a processor thread implementation.

Transaction Execution in Intel® Based Embodiments

In "Intel® Architecture Instruction Set Extensions Programming Reference" 319433-012A, February 2012, incorporated herein by reference in its entirety, Chapter 8 teaches, in part, that multithreaded applications may take advantage of increasing numbers of CPU cores to achieve higher performance. However, the writing of multi-threaded applications requires programmers to understand and take into account data sharing among the multiple threads. Access to shared data typically requires synchronization mechanisms. These synchronization mechanisms are used to ensure that multiple threads update shared data by serializing operations that are applied to the shared data, often through the use of a critical section that is protected by a lock. Since serialization limits concurrency, programmers try to limit the overhead due to synchronization.

Intel® Transactional Synchronization Extensions (Intel® TSX) allow a processor to dynamically determine whether threads need to be serialized through lock-protected critical sections, and to perform that serialization only when required. This allows the processor to expose and exploit concurrency that is hidden in an application because of dynamically unnecessary synchronization.

With Intel TSX, programmer-specified code regions (also referred to as "transactional regions" or just "transactions") are executed transactionally. If the transactional execution completes successfully, then all memory operations performed within the transactional region will appear to have occurred instantaneously when viewed from other processors. A processor makes the memory operations of the executed transaction, performed within the transactional region, visible to other processors only when a successful commit occurs, i.e., when the transaction successfully completes execution. This process is often referred to as an atomic commit.

Intel TSX provides two software interfaces to specify regions of code for transactional execution. Hardware Lock Elision (HLE) is a legacy compatible instruction set extension (comprising the XACQUIRE and XRELEASE prefixes) to specify transactional regions. Restricted Transactional Memory (RTM) is a new instruction set interface (comprising the XBEGIN, XEND, and ABORT instructions) for programmers to define transactional regions in a more flexible manner than that possible with HLE. HLE is for programmers who prefer the backward compatibility of the conventional mutual exclusion programming model and would like to run HLE-enabled software on legacy hardware but would also like to take advantage of the new lock elision capabilities on hardware with HLE support. RTM is for programmers who prefer a flexible interface to the transactional execution hardware. In addition, Intel TSX also provides an XTEST instruction. This instruction allows software to query whether the logical processor is transactionally executing in a transactional region identified by either HLE or RTM.

Since a successful transactional execution ensures an atomic commit, the processor executes the code region optimistically without explicit synchronization. If synchronization was unnecessary for that specific execution, execution can commit without any cross-thread serialization. If the processor cannot commit atomically, then the optimistic execution fails. When this happens, the processor will roll back the execution, a process referred to as a transactional abort. On a transactional abort, the processor will discard all updates performed in the memory region used by the transaction, restore architectural state to appear as if the optimistic execution never occurred, and resume execution non-transactionally.

A processor can perform a transactional abort for numerous reasons. A primary reason to abort a transaction is due to conflicting memory accesses between the transactionally executing logical processor and another logical processor. Such conflicting memory accesses may prevent a successful transactional execution. Memory addresses read from within a transactional region constitute the read-set of the transactional region and addresses written to within the transactional region constitute the write-set of the transactional region. Intel TSX maintains the read- and write-sets at the granularity of a cache line. A conflicting memory access occurs if another logical processor either reads a location that is part of the transactional region's write-set or writes a location that is a part of either the read- or write-set of the transactional region. A conflicting access typically means that serialization is required for this code region. Since Intel TSX detects data conflicts at the granularity of a cache line, unrelated data locations placed in the same cache line will be detected as conflicts that result in transactional aborts. Transactional aborts may also occur due to limited transactional resources. For example, the amount of data accessed in the region may exceed an implementation-specific capacity. Additionally, some instructions and system events may cause transactional aborts. Frequent transactional aborts result in wasted cycles and increased inefficiency.

Hardware Lock Elision

Hardware Lock Elision (HLE) provides a legacy compatible instruction set interface for programmers to use transactional execution. HLE provides two new instruction prefix hints: XACQUIRE and XRELEASE.

With HLE, a programmer adds the XACQUIRE prefix to the front of the instruction that is used to acquire the lock that is protecting the critical section. The processor treats the prefix as a hint to elide the write associated with the lock acquire operation. Even though the lock acquire has an associated write operation to the lock, the processor does not add the address of the lock to the transactional region's write-set nor does it issue any write requests to the lock. Instead, the address of the lock is added to the read-set. The logical processor enters transactional execution. If the lock was available before the XACQUIRE prefixed instruction, then all other processors will continue to see the lock as available afterwards. Since the transactionally executing logical processor neither added the address of the lock to its write-set nor performed externally visible write operations to the lock, other logical processors can read the lock without causing a data conflict. This allows other logical processors to also enter and concurrently execute the critical section protected by the lock. The processor automatically detects any data conflicts that occur during the transactional execution and will perform a transactional abort if necessary.

Even though the eliding processor did not perform any external write operations to the lock, the hardware ensures program order of operations on the lock. If the eliding processor itself reads the value of the lock in the critical section, it will appear as if the processor had acquired the lock, i.e. the read will return the non-elided value. This behavior allows an HLE execution to be functionally equivalent to an execution without the HLE prefixes.

An XRELEASE prefix can be added in front of an instruction that is used to release the lock protecting a critical section. Releasing the lock involves a write to the lock. If the instruction is to restore the value of the lock to the value the lock had prior to the XACQUIRE prefixed lock acquire operation on the same lock, then the processor elides the external write request associated with the release of the lock and does not add the address of the lock to the write-set. The processor then attempts to commit the transactional execution.

With HLE, if multiple threads execute critical sections protected by the same lock but they do not perform any conflicting operations on each other's data, then the threads can execute concurrently and without serialization. Even though the software uses lock acquisition operations on a common lock, the hardware recognizes this, elides the lock, and executes the critical sections on the two threads without requiring any communication through the lock—if such communication was dynamically unnecessary.

If the processor is unable to execute the region transactionally, then the processor will execute the region non-transactionally and without elision. HLE enabled software has the same forward progress guarantees as the underlying non-HLE lock-based execution. For successful HLE execution, the lock and the critical section code must follow certain guidelines. These guidelines only affect performance; and failure to follow these guidelines will not result in a functional failure. Hardware without HLE support will ignore the XACQUIRE and XRELEASE prefix hints and will not perform any elision since these prefixes correspond to the REPNE/REPE IA-32 prefixes which are ignored on the instructions where XACQUIRE and XRELEASE are valid. Importantly, HLE is compatible with the existing lock-based programming model. Improper use of hints will not cause functional bugs though it may expose latent bugs already in the code.

Restricted Transactional Memory (RTM) provides a flexible software interface for transactional execution. RTM provides three new instructions—XBEGIN, XEND, and XABORT—for programmers to start, commit, and abort a transactional execution.

The programmer uses the XBEGIN instruction to specify the start of a transactional code region and the XEND instruction to specify the end of the transactional code region. If the RTM region could not be successfully executed transactionally, then the XBEGIN instruction takes an operand that provides a relative offset to the fallback instruction address.

A processor may abort RTM transactional execution for many reasons. In many instances, the hardware automatically detects transactional abort conditions and restarts execution from the fallback instruction address with the architectural state corresponding to that present at the start of the XBEGIN instruction and the EAX register updated to describe the abort status.

The XABORT instruction allows programmers to abort the execution of an RTM region explicitly. The XABORT instruction takes an 8-bit immediate argument that is loaded into the EAX register and will thus be available to software following an RTM abort. RTM instructions do not have any data memory location associated with them. While the hardware provides no guarantees as to whether an RTM region will ever successfully commit transactionally, most transactions that follow the recommended guidelines are expected to successfully commit transactionally. However, programmers must always provide an alternative code sequence in the fallback path to guarantee forward progress. This may be as simple as acquiring a lock and executing the specified code region non-transactionally. Further, a transaction that always aborts on a given implementation may complete transactionally on a future implementation. Therefore, programmers must ensure the code paths for the transactional region and the alternative code sequence are functionally tested.

Detection of HLE Support

A processor supports HLE execution if CPUID.07H.EBX.HLE [bit 4]=1. However, an application can use the HLE prefixes (XACQUIRE and XRELEASE) without checking whether the processor supports HLE. Processors without HLE support ignore these prefixes and will execute the code without entering transactional execution.

Detection of RTM Support

A processor supports RTM execution if CPUID.07H.EBX.RTM [bit 11]=1. An application must check if the processor supports RTM before it uses the RTM instructions (XBEGIN, XEND, XABORT). These instructions will generate a #UD exception when used on a processor that does not support RTM.

Detection of XTEST Instruction

A processor supports the XTEST instruction if it supports either HLE or RTM. An application must check either of these feature flags before using the XTEST instruction. This instruction will generate a #UD exception when used on a processor that does not support either HLE or RTM.

Querying Transactional Execution Status

The XTEST instruction can be used to determine the transactional status of a transactional region specified by HLE or RTM. Note, while the HLE prefixes are ignored on processors that do not support HLE, the XTEST instruction will generate a #UD exception when used on processors that do not support either HLE or RTM.

Requirements for HLE Locks

For HLE execution to successfully commit transactionally, the lock must satisfy certain properties and access to the lock must follow certain guidelines.

An XRELEASE prefixed instruction must restore the value of the elided lock to the value it had before the lock acquisition. This allows hardware to safely elide locks by not adding them to the write-set. The data size and data address of the lock release (XRELEASE prefixed) instruction must match that of the lock acquire (XACQUIRE prefixed) and the lock must not cross a cache line boundary.

Software should not write to the elided lock inside a transactional HLE region with any instruction other than an XRELEASE prefixed instruction, otherwise such a write may cause a transactional abort. In addition, recursive locks (where a thread acquires the same lock multiple times without first releasing the lock) may also cause a transactional abort. Note that software can observe the result of the elided lock acquire inside the critical section. Such a read operation will return the value of the write to the lock.

The processor automatically detects violations to these guidelines, and safely transitions to a non-transactional execution without elision. Since Intel TSX detects conflicts at the granularity of a cache line, writes to data collocated on the same cache line as the elided lock may be detected as data conflicts by other logical processors eliding the same lock.

Transactional Nesting

Both HLE and RTM support nested transactional regions. However, a transactional abort restores state to the operation that started transactional execution: either the outermost XACQUIRE prefixed HLE eligible instruction or the outermost XBEGIN instruction. The processor treats all nested transactions as one transaction.

HLE Nesting and Elision

Programmers can nest HLE regions up to an implementation specific depth of MAX_HLE_NEST_COUNT. Each logical processor tracks the nesting count internally but this count is not available to software. An XACQUIRE prefixed HLE-eligible instruction increments the nesting count, and an XRELEASE prefixed HLE-eligible instruction decrements it. The logical processor enters transactional execution when the nesting count goes from zero to one. The logical processor attempts to commit only when the nesting count becomes zero. A transactional abort may occur if the nesting count exceeds MAX_HLE_NEST_COUNT.

In addition to supporting nested HLE regions, the processor can also elide multiple nested locks. The processor tracks a lock for elision beginning with the) (ACQUIRE prefixed HLE eligible instruction for that lock and ending with the XRELEASE prefixed HLE eligible instruction for that same lock. The processor can, at any one time, track up to a MAX_HLE_ELIDED_LOCKS number of locks. For example, if the implementation supports a MAX_HLE_ELIDED_LOCKS value of two and if the programmer nests three HLE identified critical sections (by performing XACQUIRE prefixed HLE eligible instructions on three distinct locks without performing an intervening XRELEASE prefixed HLE eligible instruction on any one of the locks), then the first two locks will be elided, but the third won't be elided (but will be added to the transaction's writeset). However, the execution will still continue transactionally. Once an XRELEASE for one of the two elided locks is encountered, a subsequent lock acquired through the XACQUIRE prefixed HLE eligible instruction will be elided.

The processor attempts to commit the HLE execution when all elided XACQUIRE and XRELEASE pairs have been matched, the nesting count goes to zero, and the locks have satisfied requirements. If execution cannot commit atomically, then execution transitions to a non-transactional execution without elision as if the first instruction did not have an XACQUIRE prefix.

RTM Nesting

Programmers can nest RTM regions up to an implementation specific MAX_RTM_NEST_COUNT. The logical processor tracks the nesting count internally but this count is not available to software. An XBEGIN instruction increments the nesting count, and an XEND instruction decrements the nesting count. The logical processor attempts to commit only if the nesting count becomes zero. A transactional abort occurs if the nesting count exceeds MAX_RTM_NEST_COUNT.

Nesting HLE and RTM

HLE and RTM provide two alternative software interfaces to a common transactional execution capability. Transactional processing behavior is implementation specific when HLE and RTM are nested together, e.g., HLE is inside RTM or RTM is inside HLE. However, in all cases, the implementation will maintain HLE and RTM semantics. An implementation may choose to ignore HLE hints when used inside RTM regions, and may cause a transactional abort when RTM instructions are used inside HLE regions. In the latter case, the transition from transactional to non-transactional execution occurs seamlessly since the processor will re-execute the HLE region without actually doing elision, and then execute the RTM instructions.

Abort Status Definition

RTM uses the EAX register to communicate abort status to software. Following an RTM abort the EAX register has the following definition.

TABLE 1

RTM Abort Status Definition

| EAX Register Bit Position | Meaning |
| --- | --- |
| 0 | Set if abort caused by XABORT instruction |
| 1 | If set, the transaction may succeed on retry, this bit is always clear if bit 0 is set |
| 2 | Set if another logical processor conflicted with a memory address that was part of the transaction that aborted |
| 3 | Set if an internal buffer overflowed |

TABLE 1-continued

RTM Abort Status Definition

| EAX Register Bit Position | Meaning |
|---|---|
| 4 | Set if a debug breakpoint was hit |
| 5 | Set if an abort occurred during execution of a nested transaction |
| 26:6 | Reserved |
| 31-24 | XABORT argument (only valid if bit 0 set, otherwise reserved) |

The EAX abort status for RTM only provides causes for aborts. It does not by itself encode whether an abort or commit occurred for the RTM region. The value of EAX can be 0 following an RTM abort. For example, a CPUID instruction when used inside an RTM region causes a transactional abort and may not satisfy the requirements for setting any of the EAX bits. This may result in an EAX value of 0.

RTM Memory Ordering

A successful RTM commit causes all memory operations in the RTM region to appear to execute atomically. A successfully committed RTM region consisting of an XBEGIN followed by an XEND, even with no memory operations in the RTM region, has the same ordering semantics as a LOCK prefixed instruction.

The XBEGIN instruction does not have fencing semantics. However, if an RTM execution aborts, then all memory updates from within the RTM region are discarded and are not made visible to any other logical processor.

RTM-Enabled Debugger Support

By default, any debug exception inside an RTM region will cause a transactional abort and will redirect control flow to the fallback instruction address with architectural state recovered and bit 4 in EAX set. However, to allow software debuggers to intercept execution on debug exceptions, the RTM architecture provides additional capability.

If bit 11 of DR7 and bit 15 of the IA32_DEBUGCTL_MSR are both 1, any RTM abort due to a debug exception (#DB) or breakpoint exception (#BP) causes execution to roll back and restart from the XBEGIN instruction instead of the fallback address. In this scenario, the EAX register will also be restored back to the point of the XBEGIN instruction.

Programming Considerations

Typical programmer-identified regions are expected to transactionally execute and commit successfully. However, Intel TSX does not provide any such guarantee. A transactional execution may abort for many reasons. To take full advantage of the transactional capabilities, programmers should follow certain guidelines to increase the probability of their transactional execution committing successfully.

This section discusses various events that may cause transactional aborts. The architecture ensures that updates performed within a transaction that subsequently aborts execution will never become visible. Only committed transactional executions initiate an update to the architectural state. Transactional aborts never cause functional failures and only affect performance.

Instruction Based Considerations

Programmers can use any instruction safely inside a transaction (HLE or RTM) and can use transactions at any privilege level. However, some instructions will always abort the transactional execution and cause execution to seamlessly and safely transition to a non-transactional path.

Intel TSX allows for most common instructions to be used inside transactions without causing aborts. The following operations inside a transaction do not typically cause an abort:
  Operations on the instruction pointer register, general purpose registers (GPRs) and the status flags (CF, OF, SF, PF, AF, and ZF); and
  Operations on XMM and YMM registers and the MXCSR register.

However, programmers must be careful when intermixing SSE and AVX operations inside a transactional region. Intermixing SSE instructions accessing XMM registers and AVX instructions accessing YMM registers may cause transactions to abort. Programmers may use REP/REPNE prefixed string operations inside transactions. However, long strings may cause aborts. Further, the use of CLD and STD instructions may cause aborts if they change the value of the DF flag. However, if DF is 1, the STD instruction will not cause an abort. Similarly, if DF is 0, then the CLD instruction will not cause an abort.

Instructions not enumerated here as causing abort when used inside a transaction will typically not cause a transaction to abort (examples include but are not limited to MFENCE, LFENCE, SFENCE, RDTSC, RDTSCP, etc.).

The following instructions will abort transactional execution on any implementation:
  XABORT
  CPUID
  PAUSE In addition, in some implementations, the following instructions may always cause transactional aborts. These instructions are not expected to be commonly used inside typical transactional regions. However, programmers must not rely on these instructions to force a transactional abort, since whether they cause transactional aborts is implementation dependent.
  Operations on X87 and MMX architecture state. This includes all MMX and X87 instructions, including the FXRSTOR and FXSAVE instructions.
  Update to non-status portion of EFLAGS: CLI, STI, POPFD, POPFQ, CLTS.
  Instructions that update segment registers, debug registers and/or control registers: MOV to DS/ES/FS/GS/SS, POP DS/ES/FS/GS/SS, LDS, LES, LFS, LGS, LSS, SWAPGS, WRFSBASE, WRGSBASE, LGDT, SGDT, LIDT, SIDT, LLDT, SLDT, LTR, STR, Far CALL, Far JMP, Far RET, IRET, MOV to DRx, MOV to CR0/CR2/CR3/CR4/CR8 and LMSW.
  Ring transitions: SYSENTER, SYSCALL, SYSEXIT, and SYSRET.
  TLB and Cacheability control: CLFLUSH, INVD, WBINVD, INVLPG, INVPCID, and memory instructions with a non-temporal hint (MOVNTDQA, MOVNTDQ, MOVNTI, MOVNTPD, MOVNTPS, and MOVNTQ).
  Processor state save: XSAVE, XSAVEOPT, and XRSTOR.
  Interrupts: INTn, INTO.
  IO: IN, INS, REP INS, OUT, OUTS, REP OUTS and their variants.
  VMX: VMPTRLD, VMPTRST, VMCLEAR, VMREAD, VMWRITE, VMCALL, VMLAUNCH, VMRESUME, VMXOFF, VMXON, INVEPT, and INVVPID.
  SMX: GETSEC.
  UD2, RSM, RDMSR, WRMSR, HLT, MONITOR, MWAIT, XSETBV, VZEROUPPER, MASKMOVQ, and V/MASKMOVDQU.

Runtime Considerations

In addition to the instruction-based considerations, runtime events may cause transactional execution to abort. These may be due to data access patterns or micro-architectural implementation features. The following list is not a comprehensive discussion of all abort causes.

Any fault or trap in a transaction that must be exposed to software will be suppressed. Transactional execution will abort and execution will transition to a non-transactional execution, as if the fault or trap had never occurred. If an exception is not masked, then that un-masked exception will result in a transactional abort and the state will appear as if the exception had never occurred.

Synchronous exception events (#DE, #OF, #NP, #SS, #GP, #BR, #UD, #AC, #XF, #PF, #NM, #TS, #MF, #DB, #BP/INT3) that occur during transactional execution may cause an execution not to commit transactionally, and require a non-transactional execution. These events are suppressed as if they had never occurred. With HLE, since the non-transactional code path is identical to the transactional code path, these events will typically re-appear when the instruction that caused the exception is re-executed non-transactionally, causing the associated synchronous events to be delivered appropriately in the non-transactional execution. Asynchronous events (NMI, SMI, INTR, IPI, PMI, etc.) occurring during transactional execution may cause the transactional execution to abort and transition to a non-transactional execution. The asynchronous events will be pended and handled after the transactional abort is processed.

Transactions only support write-back cacheable memory type operations. A transaction may always abort if the transaction includes operations on any other memory type. This includes instruction fetches to UC memory type.

Memory accesses within a transactional region may require the processor to set the Accessed and Dirty flags of the referenced page table entry. The behavior of how the processor handles this is implementation specific. Some implementations may allow the updates to these flags to become externally visible even if the transactional region subsequently aborts. Some Intel TSX implementations may choose to abort the transactional execution if these flags need to be updated. Further, a processor's page-table walk may generate accesses to its own transactionally written but uncommitted state. Some Intel TSX implementations may choose to abort the execution of a transactional region in such situations. Regardless, the architecture ensures that, if the transactional region aborts, then the transactionally written state will not be made architecturally visible through the behavior of structures such as TLBs.

Executing self-modifying code transactionally may also cause transactional aborts. Programmers must continue to follow the Intel recommended guidelines for writing self-modifying and cross-modifying code even when employing HLE and RTM. While an implementation of RTM and HLE will typically provide sufficient resources for executing common transactional regions, implementation constraints and excessive sizes for transactional regions may cause a transactional execution to abort and transition to a non-transactional execution. The architecture provides no guarantee of the amount of resources available to do transactional execution and does not guarantee that a transactional execution will ever succeed.

Conflicting requests to a cache line accessed within a transactional region may prevent the transaction from executing successfully. For example, if logical processor P0 reads line A in a transactional region and another logical processor P1 writes line A (either inside or outside a transactional region) then logical processor P0 may abort if logical processor P1's write interferes with processor P0's ability to execute transactionally.

Similarly, if P0 writes line A in a transactional region and P1 reads or writes line A (either inside or outside a transactional region), then P0 may abort if P1's access to line A interferes with P0's ability to execute transactionally. In addition, other coherence traffic may at times appear as conflicting requests and may cause aborts. While these false conflicts may happen, they are expected to be uncommon. The conflict resolution policy to determine whether P0 or P1 aborts in the above scenarios is implementation specific.

Generic Transaction Execution Embodiments:

According to "ARCHITECTURES FOR TRANSACTIONAL MEMORY", a dissertation submitted to the Department of Computer Science and the Committee on Graduate Studies of Stanford University in partial fulfillment of the requirements for the Degree of Doctor of Philosophy, by Austen McDonald, June 2009, incorporated by reference herein in its entirety, fundamentally, there are three mechanisms needed to implement an atomic and isolated transactional region: versioning, conflict detection, and contention management.

To make a transactional code region appear atomic, all the modifications performed by that transactional code region must be stored and kept isolated from other transactions until commit time. The system does this by implementing a versioning policy. Two versioning paradigms exist: eager and lazy. An eager versioning system stores newly generated transactional values in place and stores previous memory values on the side, in what is called an undo-log. A lazy versioning system stores new values temporarily in what is called a write buffer, copying them to memory only on commit. In either system, the cache is used to optimize storage of new versions.

To ensure that transactions appear to be performed atomicly, conflicts must be detected and resolved. The two systems, i.e., the eager and lazy versioning systems, detect conflicts by implementing a conflict detection policy, either optimistic or pessimistic. An optimistic system executes transactions in parallel, checking for conflicts only when a transaction commits. A pessimistic system checks for conflicts at each load and store. Similar to versioning, conflict detection also uses the cache, marking each line as either part of the read-set, part of the write-set, or both. The two systems resolve conflicts by implementing a contention management policy. Many contention management policies exist, some are more appropriate for optimistic conflict detection and some are more appropriate for pessimistic. Described below are some example policies.

Since each transactional memory (TM) system needs both versioning detection and conflict detection, these options give rise to four distinct TM designs: Eager-Pessimistic (EP), Eager-Optimistic (EO), Lazy-Pessimistic (LP), and Lazy-Optimistic (LO). Table 2 briefly describes all four distinct TM designs.

FIGS. 1 and 2 depict an example of a multicore TM environment. FIG. 1 shows many TM-enabled CPUs (CPU1 114*a*, CPU2 114*b*, etc.) on one die 100, connected with an interconnect 122, under management of an interconnect control 120*a*, 120*b*. Each CPU 114*a*, 114*b* (also known as a Processor) may have a split cache consisting of an Instruction Cache 116*a*, 166*b* for caching instructions from memory to be executed and a Data Cache 118*a*, 118*b* with TM support for caching data (operands) of memory locations to be operated on by the CPU 114*a*, 114*b* (in FIG. 1, each CPU 114a, 114b and its associated caches are referenced as 112a, 112b). In an implementation, caches of multiple dies 100 are interconnected to support cache coherency between the caches of the multiple dies 100. In an implementation, a single cache, rather than the split cache is employed holding both instructions and data. In implementations, the CPU caches are one level of caching in a hierarchical cache structure. For example each die 100 may employ a shared cache 124 to be shared amongst all the CPUs on the die 100. In another implementation, each die may have access to a shared cache 124, shared amongst all the processors of all the dies 100.

FIG. 2 shows the details of an example transactional CPU 114, including additions to support TM. The transactional CPU (processor) 114 may include hardware for supporting Register Checkpoints 126 and special TM Registers 128. The transactional CPU cache may have the MESI bits 130, Tags 140 and Data 142 of a conventional cache but also, for example, R bits 132 showing a line has been read by the CPU 114 while executing a transaction and W bits 138 showing a line has been written-to by the CPU 114 while executing a transaction.

A key detail for programmers in any TM system is how non-transactional accesses interact with transactions. By design, transactional accesses are screened from each other using the mechanisms above. However, the interaction between a regular, non-transactional load with a transaction containing a new value for that address must still be considered. In addition, the interaction between a non-transactional store with a transaction that has read that address must also be explored. These are issues of the database concept isolation.

A TM system is said to implement strong isolation, sometimes called strong atomicity, when every non-transactional load and store acts like an atomic transaction. Therefore, non-transactional loads cannot see uncommitted data and non-transactional stores cause atomicity violations in any transactions that have read that address. A system where this is not the case is said to implement weak isolation, sometimes called weak atomicity.

Strong isolation is often more desirable than weak isolation due to the relative ease of conceptualization and implementation of strong isolation. Additionally, if a programmer has forgotten to surround some shared memory references with transactions, causing bugs, then with strong isolation, the programmer will often detect that oversight using a simple debug interface because the programmer will see a non-transactional region causing atomicity violations. Also, programs written in one model may work differently on another model.

Further, strong isolation is often easier to support in hardware TM than weak isolation. With strong isolation, since the coherence protocol already manages load and store communication between processors, transactions can detect non-transactional loads and stores and act appropriately. To implement strong isolation in software Transactional Memory (TM), non-transactional code must be modified to include read- and write-barriers; potentially crippling performance. Although great effort has been expended to remove many un-needed barriers, such techniques are often complex and performance is typically far lower than that of HTMs.

TABLE 2

Transactional Memory Design Space

| | | VERSIONING | |
|---|---|---|---|
| | | Lazy | Eager |
| CONFLICT DETECTION | Optimistic | Storing updates in a write buffer; detecting conflicts at commit time. | Not practical: waiting to update memory until commit time but detecting conflicts at access time guarantees wasted work and provides no advantage |
| | Pessimistic | Storing updates in a write buffer; detecting conflicts at access time. | Updating memory, keeping old values in undo log; detecting conflicts at access time. |

Table 2 illustrates the fundamental design space of transactional memory (versioning and conflict detection).

Eager-Pessimistic (EP)

This first TM design described below is known as Eager-Pessimistic. An EP system stores its write-set "in place" (hence the name "eager") and, to support rollback, stores the old values of overwritten lines in an "undo log". Processors use the W 138 and R 132 cache bits to track read and write-sets and detect conflicts when receiving snooped load requests. Perhaps the most notable examples of EP systems in known literature are Log™ and U™.

Beginning a transaction in an EP system is much like beginning a transaction in other systems: tm_begin( ) takes a register checkpoint, and initializes any status registers. An EP system also requires initializing the undo log, the details of which are dependent on the log format, but often involve initializing a log base pointer to a region of pre-allocated, thread-private memory, and clearing a log bounds register.

Versioning: In EP, due to the way eager versioning is designed to function, the MESI 130 state transitions (cache line indicators corresponding to Modified, Exclusive, Shared, and Invalid code states) are left mostly unchanged. Outside of a transaction, the MESI 130 state transitions are left completely unchanged. When reading a line inside a transaction, the standard coherence transitions apply (S (Shared)→S, I (Invalid)→S, or I→E (Exclusive)), issuing a load miss as needed, but the R 132 bit is also set. Likewise, writing a line applies the standard transitions (S→M, E→I, I→M), issuing a miss as needed, but also sets the W 138 (Written) bit. The first time a line is written, the old version of the entire line is loaded then written to the undo log to preserve it in case the current transaction aborts. The newly written data is then stored "in-place," over the old data.

Conflict Detection: Pessimistic conflict detection uses coherence messages exchanged on misses, or upgrades, to look for conflicts between transactions. When a read miss occurs within a transaction, other processors receive a load request; but they ignore the request if they do not have the needed line. If the other processors have the needed line non-speculatively or have the line R 132 (Read), they downgrade that line to S, and in certain cases issue a cache-to-cache transfer if they have the line in MESI's 130 M or E state. However, if the cache has the line W 138, then a conflict is detected between the two transactions and additional action(s) must be taken.

Similarly, when a transaction seeks to upgrade a line from shared to modified (on a first write), the transaction issues an exclusive load request, which is also used to detect conflicts. If a receiving cache has the line non-speculatively, then the line is invalidated, and in certain cases a cache-to-cache transfer (M or E states) is issued. But, if the line is R 132 or W 138, a conflict is detected.

Validation: Because conflict detection is performed on every load, a transaction always has exclusive access to its own write-set. Therefore, validation does not require any additional work.

Commit: Since eager versioning stores the new version of data items in place, the commit process simply clears the W 138 and R 132 bits and discards the undo log.

Abort: When a transaction rolls back, the original version of each cache line in the undo log must be restored, a process called "unrolling" or "applying" the log. This is done during tm_discard( ) and must be atomic with regard to other transactions. Specifically, the write-set must still be used to detect conflicts: this transaction has the only correct version of lines in its undo log, and requesting transactions must wait for the correct version to be restored from that log. Such a log can be applied using a hardware state machine or software abort handler.

Eager-Pessimistic has the characteristics of: Commit is simple and since it is in-place, very fast. Similarly, validation is a no-op. Pessimistic conflict detection detects conflicts early, thereby reducing the number of "doomed" transactions. For example, if two transactions are involved in a Write-After-Read dependency, then that dependency is detected immediately in pessimistic conflict detection. However, in optimistic conflict detection such conflicts are not detected until the writer commits.

Eager-Pessimistic also has the characteristics of: As described above, the first time a cache line is written, the old value must be written to the log, incurring extra cache accesses. Aborts are expensive as they require undoing the log. For each cache line in the log, a load must be issued, perhaps going as far as main memory before continuing to the next line. Pessimistic conflict detection also prevents certain serializable schedules from existing.

Additionally, because conflicts are handled as they occur, there is a potential for livelock and careful contention management mechanisms must be employed to guarantee forward progress.

Lazy-Optimistic (LO)

Another popular TM design is Lazy-Optimistic (LO), which stores its write-set in a "write buffer" or "redo log" and detects conflicts at commit time (still using the R 132 and W 138 bits).

Versioning: Just as in the EP system, the MESI protocol of the LO design is enforced outside of the transactions. Once inside a transaction, reading a line incurs the standard MESI transitions but also sets the R 132 bit. Likewise, writing a line sets the W 138 bit of the line, but handling the MESI transitions of the LO design is different from that of the EP design. First, with lazy versioning, the new versions of written data are stored in the cache hierarchy until commit while other transactions have access to old versions available in memory or other caches. To make available the old versions, dirty lines (M lines) must be evicted when first written by a transaction. Second, no upgrade misses are needed because of the optimistic conflict detection feature: if a transaction has a line in the S state, it can simply write to it and upgrade that line to an M state without communicating the changes with other transactions because conflict detection is done at commit time.

Conflict Detection and Validation: To validate a transaction and detect conflicts, LO communicates the addresses of speculatively modified lines to other transactions only when it is preparing to commit. On validation, the processor sends one, potentially large, network packet containing all the addresses in the write-set. Data is not sent, but left in the cache of the committer and marked dirty (M). To build this packet without searching the cache for lines marked W, a simple bit vector is used, called a "store buffer," with one bit per cache line to track these speculatively modified lines. Other transactions use this address packet to detect conflicts: if an address is found in the cache and the R 132 and/or W 138 bits are set, then a conflict is initiated. If the line is found but neither R 132 nor W 138 is set, then the line is simply invalidated, which is similar to processing an exclusive load.

To support transaction atomicity, these address packets must be handled atomically, i.e., no two address packets may exist at once with the same addresses. In an LO system, this can be achieved by simply acquiring a global commit token before sending the address packet. However, a two-phase commit scheme could be employed by first sending out the address packet, collecting responses, enforcing an ordering protocol (perhaps oldest transaction first), and committing once all responses are satisfactory.

Commit: Once validation has occurred, commit needs no special treatment: simply clear W 138 and R 132 bits and the store buffer. The transaction's writes are already marked dirty in the cache and other caches' copies of these lines have been invalidated via the address packet. Other processors can then access the committed data through the regular coherence protocol.

Abort: Rollback is equally easy: because the write-set is contained within the local caches, these lines can be invalidated, then clear W 138 and R 132 bits and the store buffer. The store buffer allows W lines to be found to invalidate without the need to search the cache.

Lazy-Optimistic has the characteristics of: Aborts are very fast, requiring no additional loads or stores and making only local changes. More serializable schedules can exist than found in EP, which allows an LO system to more aggressively speculate that transactions are independent, which can yield higher performance. Finally, the late detection of conflicts can increase the likelihood of forward progress.

Lazy-Optimistic also has the characteristics of: Validation takes global communication time proportional to size of write set. Doomed transactions can waste work since conflicts are detected only at commit time.

Lazy-Pessimistic (LP)

Lazy-Pessimistic (LP) represents a third TM design option, sitting somewhere between EP and LO: storing newly written lines in a write buffer but detecting conflicts on a per access basis.

Versioning: Versioning is similar but not identical to that of LO: reading a line sets its R bit 132, writing a line sets its W bit 138, and a store buffer is used to track W lines in the cache. Also, dirty (M) lines must be evicted when first written by a transaction, just as in LO. However, since conflict detection is pessimistic, load exclusives must be performed when upgrading a transactional line from I, S→M, which is unlike LO.

Conflict Detection: LP's conflict detection operates the same as EP's: using coherence messages to look for conflicts between transactions.

Validation: Like in EP, pessimistic conflict detection ensures that at any point, a running transaction has no conflicts with any other running transaction, so validation is a no-op.

Commit: Commit needs no special treatment: simply clear W 138 and R 132 bits and the store buffer, like in LO.

Abort: Rollback is also like that of LO: simply invalidate the write-set using the store buffer and clear the W and R bits and the store buffer.

Eager-Optimistic (EO)

The LP has the characteristics of: Like LO, aborts are very fast. Like EP, the use of pessimistic conflict detection reduces the number of "doomed" transactions. Like EP, some serializable schedules are not allowed and conflict detection must be performed on each cache miss.

The final combination of versioning and conflict detection is Eager-Optimistic (EO). EO may be a less than optimal choice for HTM systems: since new transactional versions are written in-place, other transactions have no choice but to notice conflicts as they occur (i.e., as cache misses occur). But since EO waits until commit time to detect conflicts, those transactions become "zombies," continuing to execute, wasting resources, yet are "doomed" to abort.

EO has proven to be useful in STMs and is implemented by Bartok-STM and McRT. A lazy versioning STM needs to check its write buffer on each read to ensure that it is reading the most recent value. Since the write buffer is not a hardware structure, this is expensive, hence the preference for write-in-place eager versioning. Additionally, since checking for conflicts is also expensive in an STM, optimistic conflict detection offers the advantage of performing this operation in bulk.

Contention Management

How a transaction rolls back once the system has decided to abort that transaction has been described above, but, since a conflict involves two transactions, the topics of which transaction should abort, how that abort should be initiated, and when should the aborted transaction be retried need to be explored. These are topics that are addressed by Contention Management (CM), a key component of transactional memory. Described below are policies regarding how the systems initiate aborts and the various established methods of managing which transactions should abort in a conflict.

Contention Management Policies

A Contention Management (CM) Policy is a mechanism that determines which transaction involved in a conflict should abort and when the aborted transaction should be retried. For example, it is often the case that retrying an aborted transaction immediately does not lead to the best performance. Conversely, employing a back-off mechanism, which delays the retrying of an aborted transaction, can yield better performance. STMs first grappled with finding the best contention management policies and many of the policies outlined below were originally developed for STMs.

CM Policies draw on a number of measures to make decisions, including ages of the transactions, size of read- and write-sets, the number of previous aborts, etc. The combinations of measures to make such decisions are endless, but certain combinations are described below, roughly in order of increasing complexity.

To establish some nomenclature, first note that in a conflict there are two sides: the attacker and the defender. The attacker is the transaction requesting access to a shared memory location. In pessimistic conflict detection, the attacker is the transaction issuing the load or load exclusive. In optimistic, the attacker is the transaction attempting to validate. The defender in both cases is the transaction receiving the attacker's request.

An Aggressive CM Policy immediately and always retries either the attacker or the defender. In LO, Aggressive means that the attacker always wins, and so Aggressive is sometimes called committer wins. Such a policy was used for the earliest LO systems. In the case of EP, Aggressive can be either defender wins or attacker wins.

Restarting a conflicting transaction that will immediately experience another conflict is bound to waste work—namely interconnect bandwidth refilling cache misses. A Polite CM Policy employs exponential backoff (but linear could also be used) before restarting conflicts. To prevent starvation, a situation where a process does not have resources allocated to it by the scheduler, the exponential backoff greatly increases the odds of transaction success after some n retries.

Another approach to conflict resolution is to randomly abort the attacker or defender (a policy called Randomized). Such a policy may be combined with a randomized backoff scheme to avoid unneeded contention.

However, making random choices, when selecting a transaction to abort, can result in aborting transactions that have completed "a lot of work", which can waste resources. To avoid such waste, the amount of work completed on the transaction can be taken into account when determining which transaction to abort. One measure of work could be a transaction's age. Other methods include Oldest, Bulk TM, Size Matters, Karma, and Polka. Oldest is a simple timestamp method that aborts the younger transaction in a conflict. Bulk TM uses this scheme. Size Matters is like Oldest but instead of transaction age, the number of read/written words is used as the priority, reverting to Oldest after a fixed number of aborts. Karma is similar, using the size of the write-set as priority. Rollback then proceeds after backing off a fixed amount of time. Aborted transactions keep their priorities after being aborted (hence the name Karma). Polka works like Karma but instead of backing off a predefined amount of time, it backs off exponentially more each time.

Since aborting wastes work, it is logical to argue that stalling an attacker until the defender has finished their transaction would lead to better performance. Unfortunately, such a simple scheme easily leads to deadlock.

Deadlock avoidance techniques can be used to solve this problem. Greedy uses two rules to avoid deadlock. The first rule is, if a first transaction, T1, has lower priority than a second transaction, T0, or if T1 is waiting for another transaction, then T1 aborts when conflicting with T0. The second rule is, if T1 has higher priority than T0 and is not waiting, then T0 waits until T1 commits, aborts, or starts waiting (in which case the first rule is applied). Greedy provides some guarantees about time bounds for executing a set of transactions. One EP design (Log™) uses a CM policy similar to Greedy to achieve stalling with conservative deadlock avoidance.

Example MESI coherency rules provide for four possible states in which a cache line of a multiprocessor cache system may reside, M, E, S, and I, defined as follows:

Modified (M): The cache line is present only in the current cache, and is dirty; it has been modified from the value in main memory. The cache is required to write the data back to main memory at some time in the future, before permitting any other read of the (no longer valid) main memory state. The write-back changes the line to the Exclusive state.

Exclusive (E): The cache line is present only in the current cache, but is clean; it matches main memory. It may be changed to the Shared state at any time, in response to a read request. Alternatively, it may be changed to the Modified state when writing to it.

Shared (S): Indicates that this cache line may be stored in other caches of the machine and is "clean"; it matches the main memory. The line may be discarded (changed to the Invalid state) at any time.

Invalid (I): Indicates that this cache line is invalid (unused).

TM coherency status indicators (R 132, W 138) may be provided for each cache line, in addition to, or encoded in the MESI coherency bits. An R 132 indicator indicates the current transaction has read from the data of the cache line, and a W 138 indicator indicates the current transaction has written to the data of the cache line.

In another aspect of TM design, a system is designed using transactional store buffers. U.S. Pat. No. 6,349,361 titled "Methods and Apparatus for Reordering and Renaming Memory References in a Multiprocessor Computer System," filed Mar. 31, 2000 and incorporated by reference herein in its entirety, teaches a method for reordering and renaming memory references in a multiprocessor computer system having at least a first and a second processor. The first processor has a first private cache and a first buffer, and the second processor has a second private cache and a second buffer. The method includes the operations of, for each of a plurality of gated store requests received by the first processor to store a datum, exclusively acquiring a cache line that contains the datum by the first private cache, and storing the datum in the first buffer. Upon the first buffer receiving a load request from the first processor to load a particular datum, the particular datum is provided to the first processor from among the data stored in the first buffer based on an in-order sequence of load and store operations. Upon the first cache receiving a load request from the second cache for a given datum, an error condition is indicated and a current state of at least one of the processors is reset to an earlier state when the load request for the given datum corresponds to the data stored in the first buffer.

The main implementation components of one such transactional memory facility are a transaction-backup register file for holding pre-transaction GR (general register) content, a cache directory to track the cache lines accessed during the transaction, a store cache to buffer stores until the transaction ends, and firmware routines to perform various complex functions. In this section a detailed implementation is described.

IBM zEnterprise EC12 Enterprise Server Embodiment

The IBM zEnterprise EC12 enterprise server introduces transactional execution (TX) in transactional memory, and is described in part in a paper, "Transactional Memory Architecture and Implementation for IBM System z" of Proceedings Pages 25-36 presented at MICRO-45, 1-5 Dec. 2012, Vancouver, British Columbia, Canada, available from IEEE Computer Society Conference Publishing Services (CPS), which is incorporated by reference herein in its entirety.

Table 3 shows an example transaction. Transactions started with TBEGIN are not assured to ever successfully complete with TEND, since they can experience an aborting condition at every attempted execution, e.g., due to repeating conflicts with other CPUs. This requires that the program support a fallback path to perform the same operation non-transactionally, e.g., by using traditional locking schemes. This puts significant burden on the programming and software verification teams, especially where the fallback path is not automatically generated by a reliable compiler.

TABLE 3

Example Transaction Code

|   |   |   |   |
|---|---|---|---|
| loop | LHI | R0,0 | *initialize retry count=0 |
|   | TBEGIN |   | *begin transaction |
|   | JNZ | abort | *go to abort code if CC1=0 |
|   | LT | R1, lock | *load and test the fallback lock |
|   | JNZ | lckbzy | *branch if lock busy |
|   | . . . perform operation . . . |   |   |
|   | TEND |   | *end transaction |
|   | . . . . . . | . . . . . . |   |
| lckbzy | TABORT |   | *abort if lock busy; this |
|   |   |   | *resumes after TBEGIN |
| abort | JO | fallback | *no retry if CC=3 |
|   | AHI | R0, 1 | *increment retry count |
|   | CIJNL | R0,6, fallback | *give up after 6 attempts |
|   | PPA | R0, TX | *random delay based on retry count |
|   | . . . potentially wait for lock to become free . . . |   |   |
|   | J | loop | *jump back to retry fallback |
|   | OBTAIN | lock | *using Compare&Swap |
|   | . . . perform operation . . . |   |   |
|   | RELEASE | lock |   |
|   | . . . . . . | . . . . . . |   |

The requirement of providing a fallback path for aborted Transaction Execution (TX) transactions can be onerous. Many transactions operating on shared data structures are expected to be short, touch only a few distinct memory locations, and use simple instructions only. For those transactions, the IBM zEnterprise EC12 introduces the concept of constrained transactions; under normal conditions, the CPU 114 assures that constrained transactions eventually end successfully, albeit without giving a strict limit on the number of necessary retries. A constrained transaction starts with a TBEGINC instruction and ends with a regular TEND. Implementing a task as a constrained or non-constrained transaction typically results in very comparable performance, but constrained transactions simplify software development by removing the need for a fallback path. IBM's Transactional Execution architecture is further described in z/Architecture, Principles of Operation, Tenth Edition, SA22-7832-09 published September 2012 from IBM, incorporated by reference herein in its entirety.

A constrained transaction starts with the TBEGINC instruction. A transaction initiated with TBEGINC must follow a list of programming constraints; otherwise the program takes a non-filterable constraint-violation interruption. Exemplary constraints may include, but not be limited to: the transaction can execute a maximum of 32 instructions, all instruction text must be within 256 consecutive bytes of memory; the transaction contains only forward-pointing relative branches (i.e., no loops or subroutine calls); the transaction can access a maximum of 4 aligned octo-words (an octoword is 32 bytes) of memory; and restriction of the instruction-set to exclude complex instructions like decimal or floating-point operations. The constraints are chosen such that many common operations like doubly linked list-insert/delete operations can be performed, including the very powerful concept of atomic compare-and-swap targeting up to 4 aligned octowords. At the same time, the constraints were chosen conservatively such that future CPU implementations can assure transaction success without needing to adjust the constraints, since that would otherwise lead to software incompatibility.

TBEGINC mostly behaves like XBEGIN in TSX or TBEGIN on IBM's zEC12 servers, except that the floating-point register (FPR) control and the program interruption filtering fields do not exist and the controls are considered to be zero. On a transaction abort, the instruction address is set back directly to the TBEGINC instead of to the instruction after, reflecting the immediate retry and absence of an abort path for constrained transactions.

Nested transactions are not allowed within constrained transactions, but if a TBEGINC occurs within a non-constrained transaction it is treated as opening a new non-constrained nesting level just like TBEGIN would. This can occur, e.g., if a non-constrained transaction calls a subroutine that uses a constrained transaction internally.

Since interruption filtering is implicitly off, all exceptions during a constrained transaction lead to an interruption into the operating system (OS). Eventual successful finishing of the transaction relies on the capability of the OS to page-in the at most 4 pages touched by any constrained transaction. The OS must also ensure time-slices long enough to allow the transaction to complete.

TABLE 4

Transaction Code Example

| | |
|---|---|
| TBEGINC | *begin constrained transaction |
| ... perform operation ... | |
| TEND | *end transaction |

Table 4 shows the constrained-transactional implementation of the code in Table 3, assuming that the constrained transactions do not interact with other locking-based code. No lock testing is shown therefore, but could be added if constrained transactions and lock-based code were mixed.

When failure occurs repeatedly, software emulation is performed using millicode as part of system firmware. Advantageously, constrained transactions have desirable properties because of the burden removed from programmers.

With reference to FIG. 3, the IBM zEnterprise EC12 processor introduced the transactional execution facility. The processor can decode 3 instructions per clock cycle; simple instructions are dispatched as single micro-ops, and more complex instructions are cracked into multiple micro-ops. The micro-ops (Uops 232b) are written into a unified issue queue 216, from where they can be issued out-of-order. Up to two fixed-point, one floating-point, two load/store, and two branch instructions can execute every cycle. A Global Completion Table (GCT) 232 holds every micro-op and a transaction nesting depth (TND) 232a. The GCT 232 is written in-order at decode time, tracks the execution status of each micro-op 232b, and completes instructions when all micro-ops 232b of the oldest instruction group have successfully executed.

The level 1 (L1) data cache 240 is a 96 KB (kilo-byte) 6-way associative cache with 256 byte cache-lines and 4 cycle use latency, coupled to a private 1 MB (mega-byte) 8-way associative 2nd-level (L2) data cache 268 with 7 cycles use-latency penalty for L1 240 misses. L1 240 cache is the cache closest to a processor and Ln cache is a cache at the nth level of caching. Both L1 240 and L2 268 caches are store-through. Six cores on each central processor (CP) chip share a 48 MB 3rd-level store-in cache, and six CP chips are connected to an off-chip 384 MB 4th-level cache, packaged together on a glass ceramic multi-chip module (MCM). Up to 4 multi-chip modules (MCMs) can be connected to a coherent symmetric multi-processor (SMP) system with up to 144 cores (not all cores are available to run customer workload).

Coherency is managed with a variant of the MESI protocol. Cache-lines can be owned read-only (shared) or exclusive; the L1 240 and L2 268 are store-through and thus do not contain dirty lines. The L3 272 and L4 caches (not shown) are store-in and track dirty states. Each cache is inclusive of all its connected lower level caches.

Coherency requests are called "cross interrogates" (XI) and are sent hierarchically from higher level to lower-level caches, and between the L4s. When one core misses the L1 240 and L2 268 and requests the cache line from its local L3 272, the L3 272 checks whether it owns the line, and if necessary sends an XI to the currently owning L2 268/L1 240 under that L3 272 to ensure coherency, before it returns the cache line to the requestor. If the request also misses the L3 272, the L3 272 sends a request to the L4 (not shown), which enforces coherency by sending XIs to all necessary L3s under that L4, and to the neighboring L4s. Then the L4 responds to the requesting L3 which forwards the response to the L2 268/L1 240.

Note that due to the inclusivity rule of the cache hierarchy, sometimes cache lines are XI'ed from lower-level caches due to evictions on higher-level caches caused by associativity overflows from requests to other cache lines. These XIs can be called "LRU XIs", where LRU stands for least recently used.

Making reference to yet another type of XI requests, Demote-XIs transition cache-ownership from exclusive into read-only state, and Exclusive-XIs transition cache ownership from exclusive into invalid state. Demote-XIs and Exclusive-XIs need a response back to the XI sender. The target cache can "accept" the XI, or send a "reject" response if it first needs to evict dirty data before accepting the XI. The L1 240/L2 268 caches are store through, but may reject demote-XIs and exclusive XIs if they have stores in their store queues that need to be sent to L3 before downgrading the exclusive state. A rejected XI will be repeated by the sender. Read-only-XIs are sent to caches that own the line read-only; no response is needed for such XIs since they cannot be rejected. The details of the SMP protocol are similar to those described for the IBM z10 by P. Mak, C. Walters, and G. Strait, in "IBM System z10 processor cache subsystem microarchitecture", IBM Journal of Research and Development, Vol 53:1, 2009, which is incorporated by reference herein in its entirety.

Transactional Instruction Execution

FIG. 3 depicts example components of an example CPU environment 112, including a CPU 114 and caches/components with which it interacts (such as those depicted in FIGS. 1 and 2). The instruction decode unit 208 (IDU) keeps track of the current transaction nesting depth 212 (TND). When the IDU 208 receives a TBEGIN instruction, the nesting depth 212 is incremented, and conversely decremented on TEND instructions. The nesting depth 212 is written into the GCT 232 for every dispatched instruction. When a TBEGIN or TEND is decoded on a speculative path that later gets flushed, the IDU's 208 nesting depth 212 is refreshed from the youngest GCT 232 entry that is not flushed. The transactional state is also written into the issue queue 216 for consumption by the execution units, mostly by the Load/Store Unit (LSU) 280, which also has an effective address calculator 236 is included in the LSU 280. The TBEGIN instruction may specify a transaction diagnostic block (TDB) for recording status information, should the transaction abort before reaching a TEND instruction.

Similar to the nesting depth, the IDU 208/GCT 232 collaboratively track the access register/floating-point register (AR/FPR) modification masks through the transaction nest; the IDU 208 can place an abort request into the GCT 232 when an AR/FPR-modifying instruction is decoded and the modification mask blocks that. When the instruction becomes next-to-complete, completion is blocked and the transaction aborts. Other restricted instructions are handled similarly, including TBEGIN if decoded while in a constrained transaction, or exceeding the maximum nesting depth.

An outermost TBEGIN is cracked into multiple micro-ops depending on the GR-Save-Mask; each micro-op 232b (including, for example uop 0, uop 1, and uop2) will be executed by one of the two fixed point units (FXUs) 220 to save a pair of GRs 228 into a special transaction-backup register file 224, that is used to later restore the GR 228 content in case of a transaction abort. Also the TBEGIN spawns micro-ops 232b to perform an accessibility test for the TDB if one is specified; the address is saved in a special purpose register for later usage in the abort case. At the decoding of an outermost TBEGIN, the instruction address and the instruction text of the TBEGIN are also saved in special purpose registers for a potential abort processing later on.

TEND and NTSTG are single micro-op 232b instructions; NTSTG (non-transactional store) is handled like a normal store except that it is marked as non-transactional in the issue queue 216 so that the LSU 280 can treat it appropriately. TEND is a no-op at execution time, the ending of the transaction is performed when TEND completes.

As mentioned, instructions that are within a transaction are marked as such in the issue queue 216, but otherwise execute mostly unchanged; the LSU 280 performs isolation tracking as described in the next section.

Since decoding is in-order, and since the IDU 208 keeps track of the current transactional state and writes it into the issue queue 216 along with every instruction from the transaction, execution of TBEGIN, TEND, and instructions before, within, and after the transaction can be performed out-of order. It is even possible (though unlikely) that TEND is executed first, then the entire transaction, and lastly the TBEGIN executes. Program order is restored through the GCT 232 at completion time. The length of transactions is not limited by the size of the GCT 232, since general purpose registers (GRs) 228 can be restored from the backup register file 224.

During execution, the program event recording (PER) events are filtered based on the Event Suppression Control, and a PER TEND event is detected if enabled. Similarly, while in transactional mode, a pseudo-random generator may be causing the random aborts as enabled by the Transaction Diagnostics Control.

Tracking for Transactional Isolation

The Load/Store Unit 280 tracks cache lines that were accessed during transactional execution, and triggers an abort if an XI from another CPU (or an LRU-XI) conflicts with the footprint. If the conflicting XI is an exclusive or demote XI, the LSU 280 rejects the XI back to the L3 272 in the hope of finishing the transaction before the L3 272 repeats the XI. This "stiff-arming" is very efficient in highly contended transactions. In order to prevent hangs when two CPUs stiff-arm each other, a XI-reject counter is implemented, which triggers a transaction abort when a threshold is met.

The L1 cache directory 240 is traditionally implemented with static random access memories (SRAMs). For the transactional memory implementation, the valid bits 244 (64 rows×6 ways) of the directory have been moved into normal logic latches, and are supplemented with two more bits per cache line: the TX-read 248 and TX-dirty 252 bits.

The TX-read 248 bits are reset when a new outermost TBEGIN is decoded (which is interlocked against a prior still pending transaction). The TX-read 248 bit is set at execution time by every load instruction that is marked "transactional" in the issue queue. Note that this can lead to over-marking if speculative loads are executed, for example on a mispredicted branch path. The alternative of setting the TX-read 248 bit at load completion time was too expensive for silicon area, since multiple loads can complete at the same time, requiring many read-ports on the load-queue.

Stores execute the same way as in non-transactional mode, but a transaction mark is placed in the store queue (STQ) 260 entry of the store instruction. At write-back time, when the data from the STQ 260 is written into the L1 240, the TX-dirty bit 252 in the L1-directory 256 is set for the written cache line. Store write-back into the L1 240 occurs only after the store instruction has completed, and at most one store is written back per cycle. Before completion and write-back, loads can access the data from the STQ 260 by means of store-forwarding; after write-back, the CPU 114 (FIG. 2) can access the speculatively updated data in the L1 240. If the transaction ends successfully, the TX-dirty bits 252 of all cache-lines are cleared, and also the TX-marks of not yet written stores are cleared in the STQ 260, effectively turning the pending stores into normal stores.

On a transaction abort, all pending transactional stores are invalidated from the STQ 260, even those already completed. All cache lines that were modified by the transaction in the L1 240, that is, have the TX-dirty bit 252 on, have their valid bits turned off, effectively removing them from the L1 240 cache instantaneously.

The architecture requires that before completing a new instruction, the isolation of the transaction read- and write-set is maintained. This isolation is ensured by stalling instruction completion at appropriate times when XIs are pending; speculative out-of order execution is allowed, optimistically assuming that the pending XIs are to different addresses and not actually cause a transaction conflict. This design fits very naturally with the XI-vs-completion interlocks that are implemented on state-of-the-art systems to ensure the strong memory ordering that the architecture requires.

When the L1 240 receives an XI, L1 240 accesses the directory to check validity of the XI'ed address in the L1 240, and if the TX-read bit 248 is active on the XI'ed line and the XI is not rejected, the LSU 280 triggers an abort. When a cache line with active TX-read bit 248 is LRU'ed from the L1 240, a special LRU-extension vector remembers for each of the 64 rows of the L1 240 that a TX-read line existed on that row. Since no precise address tracking exists for the LRU extensions, any non-rejected XI that hits a valid extension row the LSU 280 triggers an abort. Providing the LRU-extension effectively increases the read footprint capability from the L1-size to the L2-size and associativity, provided no conflicts with other CPUs 114 (FIG. 1) against the non-precise LRU-extension tracking causes aborts.

The store footprint is limited by the store cache size (the store cache is discussed in more detail below) and thus implicitly by the L2 268 size and associativity. No LRU-extension action needs to be performed when a TX-dirty 252 cache line is LRU'ed from the L1 240.

Store Cache

In state-of-the-art systems, since the L1 240 and L2 268 are store-through caches, every store instruction causes an L3 272 store access; with now 6 cores per L3 272 and further improved performance of each core, the store rate for the L3 272 (and to a lesser extent for the L2 268) becomes problematic for certain workloads. In order to avoid store queuing delays, a gathering store cache 264 had to be added, that combines stores to neighboring addresses before sending them to the L3 272.

For transactional memory performance, it is acceptable to invalidate every TX-dirty 252 cache line from the L1 240 on transaction aborts, because the L2 268 cache is very close (7 cycles L1 240 miss penalty) to bring back the clean lines. However, it would be unacceptable for performance (and silicon area for tracking) to have transactional stores write the L2 268 before the transaction ends and then invalidate all dirty L2 268 cache lines on abort (or even worse on the shared L3 272).

The two problems of store bandwidth and transactional memory store handling can both be addressed with the gathering store cache 264. The cache 232 is a circular queue of 64 entries, each entry holding 128 bytes of data with byte-precise valid bits. In non-transactional operation, when a store is received from the LSU 280, the store cache checks whether an entry exists for the same address, and if so gathers the new store into the existing entry. If no entry exists, a new entry is written into the queue, and if the number of free entries falls under a threshold, the oldest entries are written back to the L2 268 and L3 272 caches.

When a new outermost transaction begins, all existing entries in the store cache are marked closed so that no new stores can be gathered into them, and eviction of those entries to L2 268 and L3 272 is started. From that point on, the transactional stores coming out of the LSU 280 STQ 260 allocate new entries, or gather into existing transactional entries. The write-back of those stores into L2 268 and L3 272 is blocked, until the transaction ends successfully; at that point subsequent (post-transaction) stores can continue to gather into existing entries, until the next transaction closes those entries again.

The store cache is queried on every exclusive or demote XI, and causes an XI reject if the XI compares to any active entry. If the core is not completing further instructions while continuously rejecting XIs, the transaction is aborted at a certain threshold to avoid hangs.

The LSU 280 requests a transaction abort when the store cache overflows. The LSU 280 detects this condition when it tries to send a new store that cannot merge into an existing entry, and the entire store cache is filled with stores from the current transaction. The store cache is managed as a subset of the L2 268: while transactionally dirty lines can be evicted from the L1 240, they have to stay resident in the L2 268 throughout the transaction. The maximum store footprint is thus limited to the store cache size of 64×128 bytes, and it is also limited by the associativity of the L2 268. Since the L2 268 is 8-way associative and has 512 rows, it is typically large enough to not cause transaction aborts.

If a transaction aborts, the store cache is notified and all entries holding transactional data are invalidated. The store cache also has a mark per doubleword (8 bytes) whether the entry was written by a NTSTG instruction—those doublewords stay valid across transaction aborts.

Millicode-Implemented Functions

Traditionally, IBM mainframe server processors contain a layer of firmware called millicode which performs complex functions like certain CISC instruction executions, interruption handling, system synchronization, and RAS. Millicode includes machine dependent instructions as well as instructions of the instruction set architecture (ISA) that are fetched and executed from memory similarly to instructions of application programs and the operating system (OS). Firmware resides in a restricted area of main memory that customer programs cannot access. When hardware detects a situation that needs to invoke millicode, the instruction fetching unit 204 switches into "millicode mode" and starts fetching at the appropriate location in the millicode memory area. Millicode may be fetched and executed in the same way as instructions of the instruction set architecture (ISA), and may include ISA instructions.

For transactional memory, millicode is involved in various complex situations. Every transaction abort invokes a dedicated millicode sub-routine to perform the necessary abort operations. The transaction-abort millicode starts by reading special-purpose registers (SPRs) holding the hardware internal abort reason, potential exception reasons, and the aborted instruction address, which millicode then uses to store a TDB if one is specified. The TBEGIN instruction text is loaded from an SPR to obtain the GR-save-mask, which is needed for millicode to know which GRs 238 to restore.

The CPU 114 (FIG. 2) supports a special millicode-only instruction to read out the backup-GRs 224 and copy them into the main GRs 228. The TBEGIN instruction address is also loaded from an SPR to set the new instruction address in the PSW to continue execution after the TBEGIN once the millicode abort sub-routine finishes. That PSW may later be saved as program-old PSW in case the abort is caused by a non-filtered program interruption.

The TABORT instruction may be millicode implemented; when the IDU 208 decodes TABORT, it instructs the instruction fetch unit to branch into TABORT's millicode, from which millicode branches into the common abort sub-routine.

The Extract Transaction Nesting Depth (ETND) instruction may also be millicoded, since it is not performance critical; millicode loads the current nesting depth out of a special hardware register and places it into a GR 228. The PPA instruction is millicoded; it performs the optimal delay based on the current abort count provided by software as an operand to PPA, and also based on other hardware internal state.

For constrained transactions, millicode may keep track of the number of aborts. The counter is reset to 0 on successful TEND completion, or if an interruption into the OS occurs (since it is not known if or when the OS will return to the program). Depending on the current abort count, millicode can invoke certain mechanisms to improve the chance of success for the subsequent transaction retry. The mechanisms involve, for example, successively increasing random delays between retries, and reducing the amount of speculative execution to avoid encountering aborts caused by speculative accesses to data that the transaction is not actually using. As a last resort, millicode can broadcast to other CPUs 114 (FIG. 2) to stop all conflicting work, retry the local transaction, before releasing the other CPUs 114 to continue normal processing. Multiple CPUs 114 must be coordinated to not cause deadlocks, so some serialization between millicode instances on different CPUs 114 is required.

Figure 4:
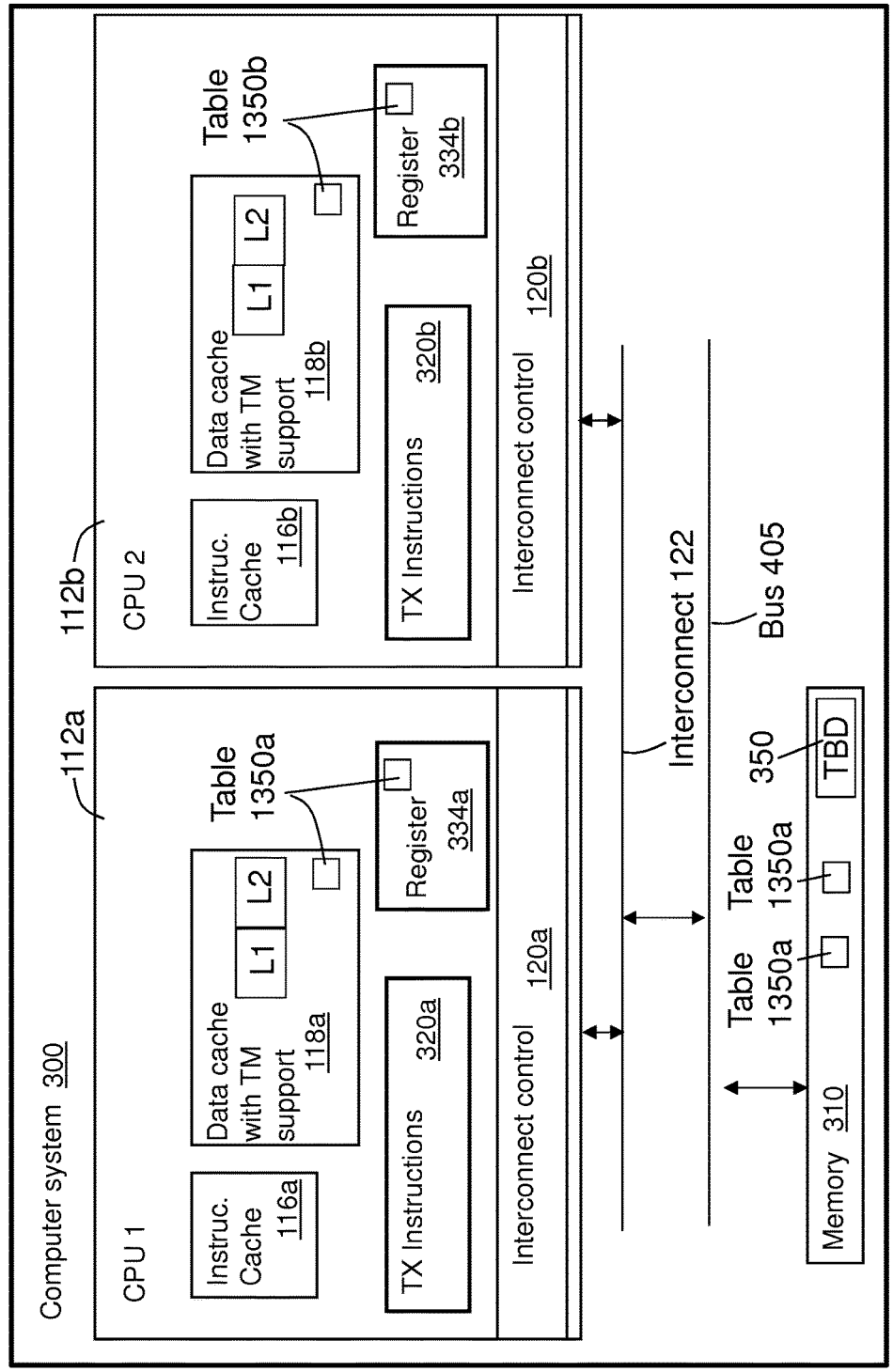
FIG. 4 depicts a schematic block diagram of a computer system having components as the multiprocessor systems shown in FIGS. 1-3, for allowing requests and responses in a hardware transactional memory environment in accordance with an embodiment.

FIG. 4 illustrates a computer system 300 according to an embodiment. FIG. 4 is configured to implement features discussed in FIGS. 1-3 and 5-18. The computer 300 comprises a multiple processors designated as processor 112a (CPU 1) and 112b (CPU 2) (along with additional processors not shown) in communication with a memory 310 by way of a hierarchical cache subsystem, wherein transactional loads, by the processor, are monitored in a cache of a hierarchical cache subsystem. The computer system 300 shown in FIG. 4 has the same elements as the computer system 100 shown in FIG. 1 and the same reference numerals, but every element in FIG. 1 is not shown in FIG. 4.

The computer system 300 can manage a request, for example, an interruption, presented to one or more processors which are available for, or currently processing transactions. In one example, a requesting processor (e.g., CPU 1 (112a)) can select a receiving/remote processor (e.g., CPU 2 (112b)) and send a request to the selected remote processor. In one example, the computer system is a transactional-execution (TX) system or environment, e.g., including a CPU or processor capable of executing a transaction. Each transaction is respectively shown as transaction instructions 320a and 320b that respectively execute in processors 112a and 112b. Each processor 112a and 112b has its own register 334a and 334b, respectively.

Each data cache 118a and 118b may respectively include its own L1 and L2 cache. Computer memory is generically represented by memory 310, which can include higher level cache memory in the CPU's designated as TX CPU's, that is, the processors 112a and 112b. Each processor 112a and 112b has its own local transaction interference tracking table designated as tables 1350a and 1350b, respectively. The tables 1350a and 1350b may be stored respectively in the data cache 118a, 118b, registers 334a, 334b, and/or in memory 310. The memory 310 may also include a transaction diagnostic block 350 for storing diagnostic information of transactions, which may include the transaction interference information (along with statistics) stored in tables 1350a and 1350b, as discussed further herein.

The computer system 300 is a representation of a transaction (TX) environment that sends, receives, and processes both requests and responses according to embodiments. Note that various examples are provided in which the processor 112a (CPU 1) is illustrated as the requesting processor that generates and sends a request to the processor 112b (CPU 2) that is illustrated as the receiving/remote processor receiving the request. It is understood that this designation is for explanation purposes, as either processor may send and receive requests for data as understood by one skilled in the art.

Figure 5:
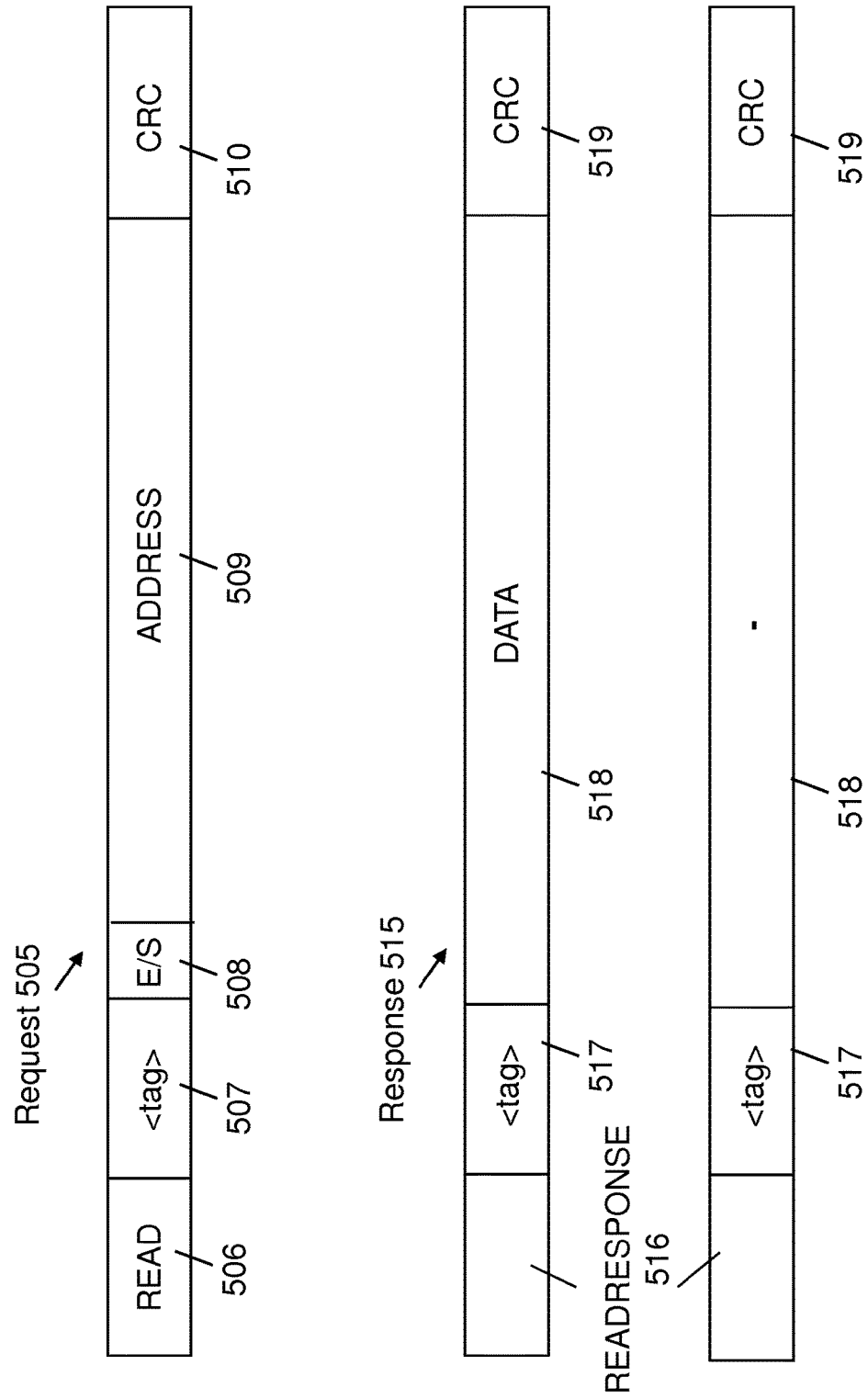
FIG. 5 depicts an exemplary protocol request and response in accordance with an embodiment.

FIG. 5 illustrates a protocol request and response example. The protocol request may be referred to as a mainframe multiprocessor protocol, and the protocol may be via a bus based or switch based interconnect. The protocol may be all parallel signaling (bus snooping), serial packets, or a combination thereof.

As one example, a request 505 for data may be sent from CPU 1 (112a) to CPU 2 (112b). The request 505 includes a type field 506 that tells what type of request is being sent (e.g., read shared or a read exclusive—or, read for ownership—request in accordance with the known MESI coherence protocol, or protocol requests in accordance with other such protocols), and a tag field 507 that identifies the particular processor (e.g., CPU 1) that sent the request and optionally the receiving processor, e.g., CPU 2 that the request is being sent to and, optionally, if multiple requests can be concurrently processed, a specific request ID to uniquely identify each request. The request 505 also includes an access field 508 that identifies the type of access being requested by the requesting processor (CPU 1), and an address field 509. The address field 509 identifies the memory address of the cache line or memory word being requested. The request 505 protocol may include an error correction field 510 that contains an error detection and/or correction code used, e.g., cyclic redundancy check (CRC), parity bits, or ECC.

A response 515 may be sent back from the receiving processor (CPU 2) to the requesting processor (CPU 1). The response 515 includes type field 516 indicating the type of response, such as a read response (READRESPONSE), and a tag field 517. The tag field 517 may be the same tag as tag field 507 of the original request 505 and/or the tag field 517 may include the requested memory address of the cache line. The response 515 includes a data field 518 that is the requested data which was requested by the requesting processor (CPU 1). Some protocol responses may not include data transfers (e.g., protocol requests to escalate ownership from shared to exclusive ownership for a line) and may include only an acknowledgement that processing has performed. An error correction field 519 is included in the response 515.

In some embodiments, signaling for protocol requests may occur in parallel over a plurality of bit lines, and any unused fields may correspond to lines which have no protocol-defined value, are set to a default value, or are otherwise not considered a part of a protocol message. In some embodiments, protocol request may be transmitted in multiple "beats", e.g., successive groups of bits that in their entirety represent a protocol message. In yet other embodiments, protocol requests may be transmitted bit-serially. In protocols transmitted in multiple beats or serially, some messages may consist of more bus signaling cycles than other protocol requests.

Figure 6:
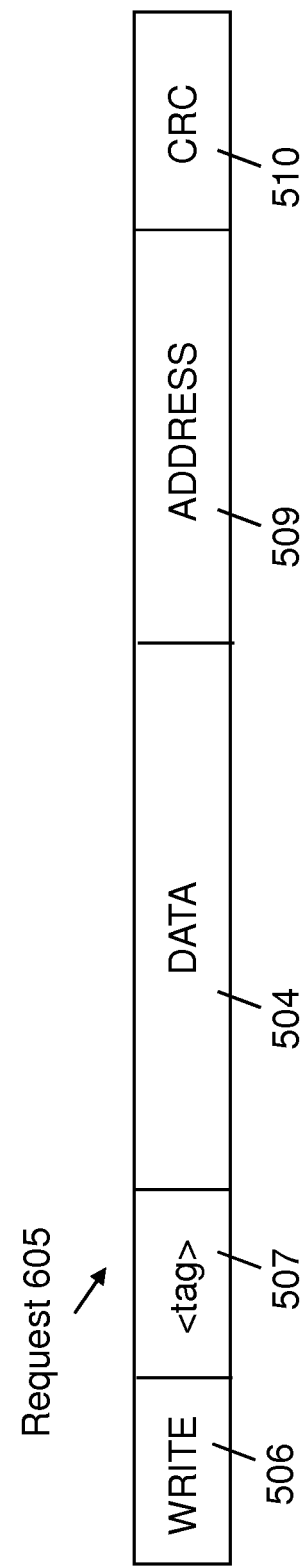
FIG. 6 depicts an exemplary protocol request in accordance with an embodiment.

FIG. 6 illustrates another protocol request example. Many protocols acquire exclusive access via RFO (read for ownership) or read-exclusive requests for write operations, while some other protocols may write directly (limited). As one example, an example request 605 to write data may be sent from CPU 1 (112a) to CPU 2 (112b). The request 605 includes the type field 506 that identifies the type of request being sent (e.g., write), and the tag field 507 that identifies the particular processor (e.g., CPU 1) that sent the write request, and optionally the receiving processor, e.g., CPU 2 that the request is being sent to and a particular request. The request 605 also includes a data field 504 that transmits the data being written by the requesting processor (CPU 1), and the address field 509. The address field 509 identifies the memory address of the cache line or address line being written to. The request 605 protocol may include the error correction field 510 that contains an error detection and/or correction code used, e.g., cyclic redundancy check (CRC), parity bits, or ECC.

In response to a write request, there is typically no response since it is not necessary to obtain data for exclusive access before performing a write.

Figure 7:
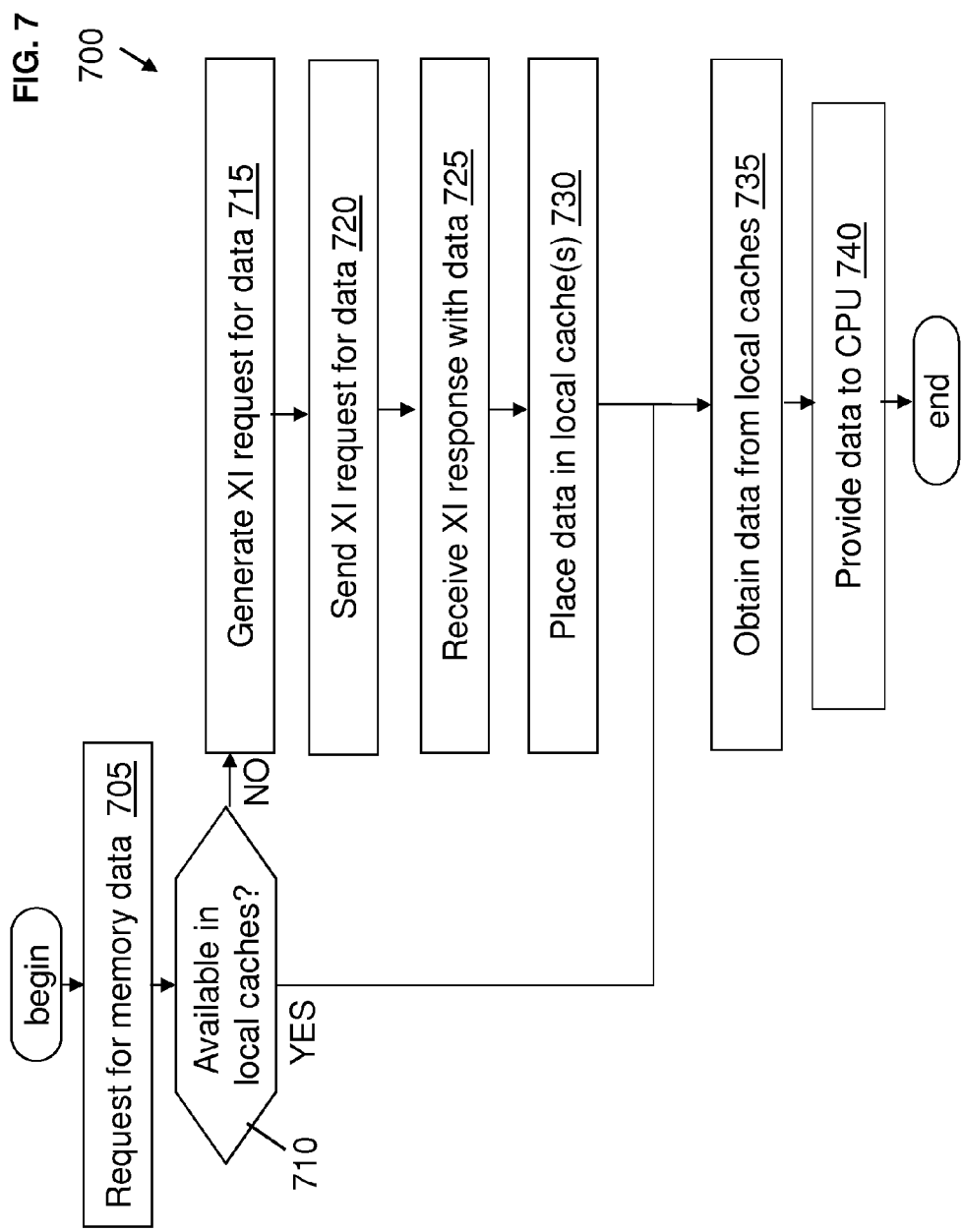
FIG. 7 depicts a flow diagram of protocol request generation by a processor making a request for data in accordance with an embodiment.

FIG. 7 is a flow diagram 700 of protocol request generation by the processor (e.g., CPU 1 (112a)) making a request for data according to an embodiment. A processor (e.g., CPU 1) has a request for memory data at block 705. The processor (e.g., CPU 1 (112a)) checks whether the requested data is in its own local cache (e.g., L1 cache in data cache 118a) at block 710. When the data is available in the processor's own local cache, the flow proceeds to block 735. When the data is not available in the local caches of the processor (CPU 1), the processor generates XI request (cross interrogate) to request the desired data from other processors (such as the CPU 2 (112b)) at block 715. The requesting processor (CPU 1) sends the XI request for the data to the receiving processor (CPU 2) via interconnect 122 at block 720, and the requesting processor (CPU 1) receives the XI response with the (requested) data from the receiving processor (CPU 2) at block 725. The requesting processor (CPU 1) places the data in its local caches (e.g., L1, L2 cache) in the data cache 118a at block 730. The requesting processor (CPU 1) obtains the data from its local cache 118a via the instruction cache 116a at block 735. The instruction cache 116a of the requesting processor provides the data to the circuits of CPU 1 for processing at block 740.

In one embodiment, and in accordance with a common cache protocol (e.g., the known MESI protocol), when the processor accesses the data for read, and the data is not available, an XI is generated for read-shared wherein data is obtained in a shared manner such that multiple CPUs 112a, 112b may have a copy of the data in a cache and wherein each CPU may process a memory read access corresponding to the data. The received data is placed in the cache and marked for shared access, and the processor may perform read accesses from the copy responsive to a memory-read operations. When the processor accesses data for write, and the data is not available in exclusive state, an XI is generated for read-exclusive wherein data is obtained in an exclusive manner such that only a single CPU (e.g., CPU 112a) may have a copy of the data in a cache. The received data is placed in the cache and marked for exclusive access, and the processor may update the copy responsive to memory-write operations. In one embodiment, when data is present in shared mode, and a write access is received, a read-exclusive XI is generated. In at least one embodiment, this is indicated as a distinct read-exclusive request wherein no data is received as part of the response. In one embodiment, when a response has been received the cache data is marked for exclusive access.

Figure 8:
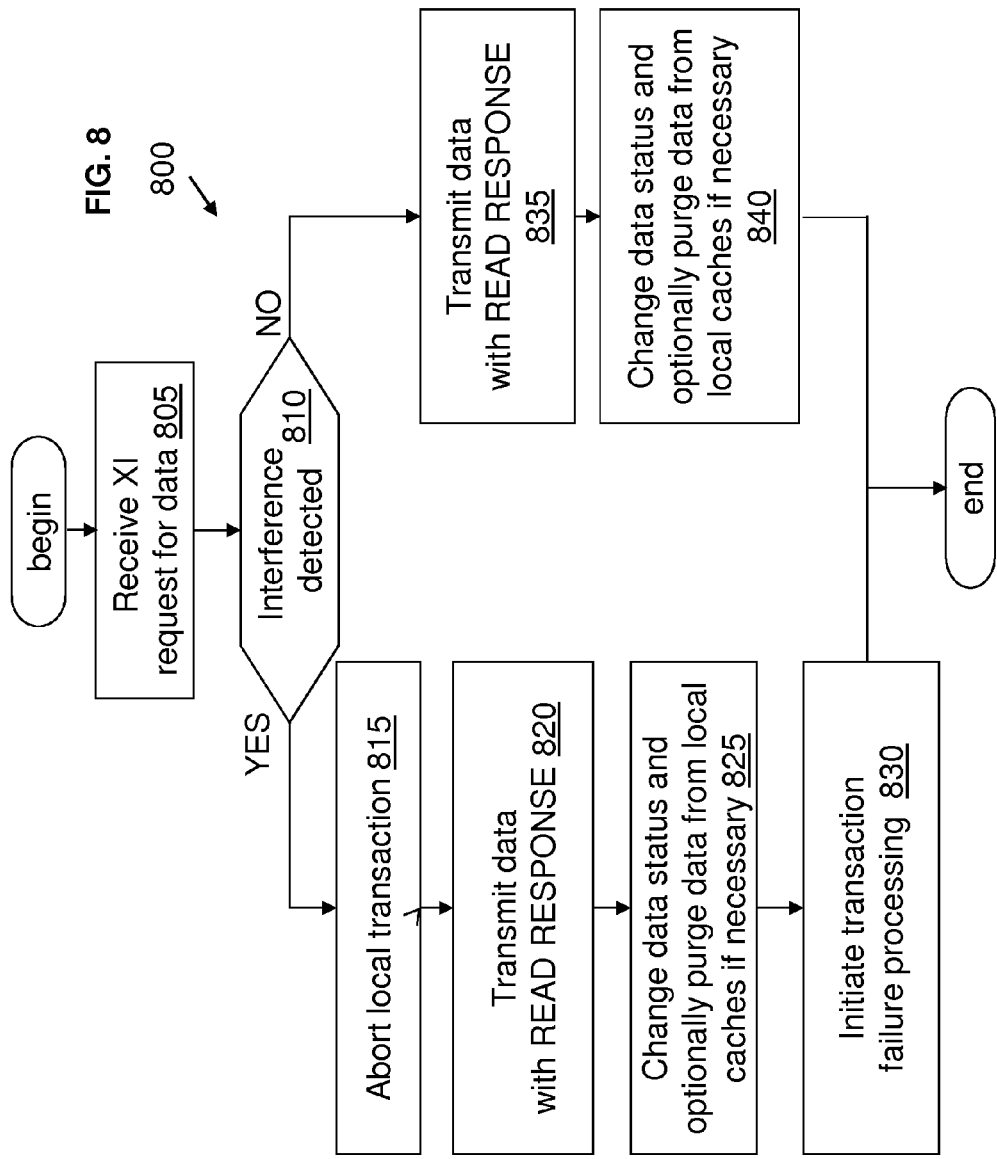
FIG. 8 depicts a flow diagram of request handling by the receiving/remote processor that receives the request and sends a response in accordance with an embodiment.

FIG. 8 illustrates an example flow diagram 800 of request handling by the receiving/remote processor (e.g., CPU 2 (112b)) receiving the request and sending a response according to an embodiment.

The remote processor (CPU 2) receives the XI request for data from the requesting processor (CPU 1) at block 805. At block 810, the remote processor (CPU 2) checks whether an interference is detected by checking if the remote processor is processing a transaction that currently needs the requested data (in the local cache of the remote processor). When the remote processor (CPU 2 (112b)) determines that remote processor is currently using the data requested by the requesting processor (CPU 1 (112a)) at block 810, the remote processor determines (YES) interference is detected and the remote processor (CPU 2) aborts the local transaction occurring at the remote processor (CPU 2) at block 815. Once the local transaction is aborted at the remote processor (CPU 2), the remote processor transmits the data with the read response (READ RESPONSE) to the requesting processor (CPU 1) at block 820. The remote processor (CPU 2) changes data status and optionally purges data from its local caches if necessary at block 825. In one embodiment, a cache status change may include releasing data from at least one of a read or write set when a transaction has been aborted. In one embodiment, a cache status change may include changing the status of a cache line in the cache directory, e.g., setting the status to one of shared, exclusive, invalid, and so forth, in accordance with a cache protocol such as the known MESI protocol. The remote processor (CPU 1) initiates transaction failure processing at block 830 and the flow ends. When the remote processor (CPU 2 (112b)) determines that remote processor is not currently using the data requested by the requesting processor (CPU 1 (112a)) at block 810, the remote processor determines NO interference is detected and the remote processor (CPU 2) transmits data with the read response (READ RESPONSE) at block 835. The remote processor (CPU 2) changes data status and optionally purges data from local caches if necessary at block 840, and the flow ends.

Figure 9:
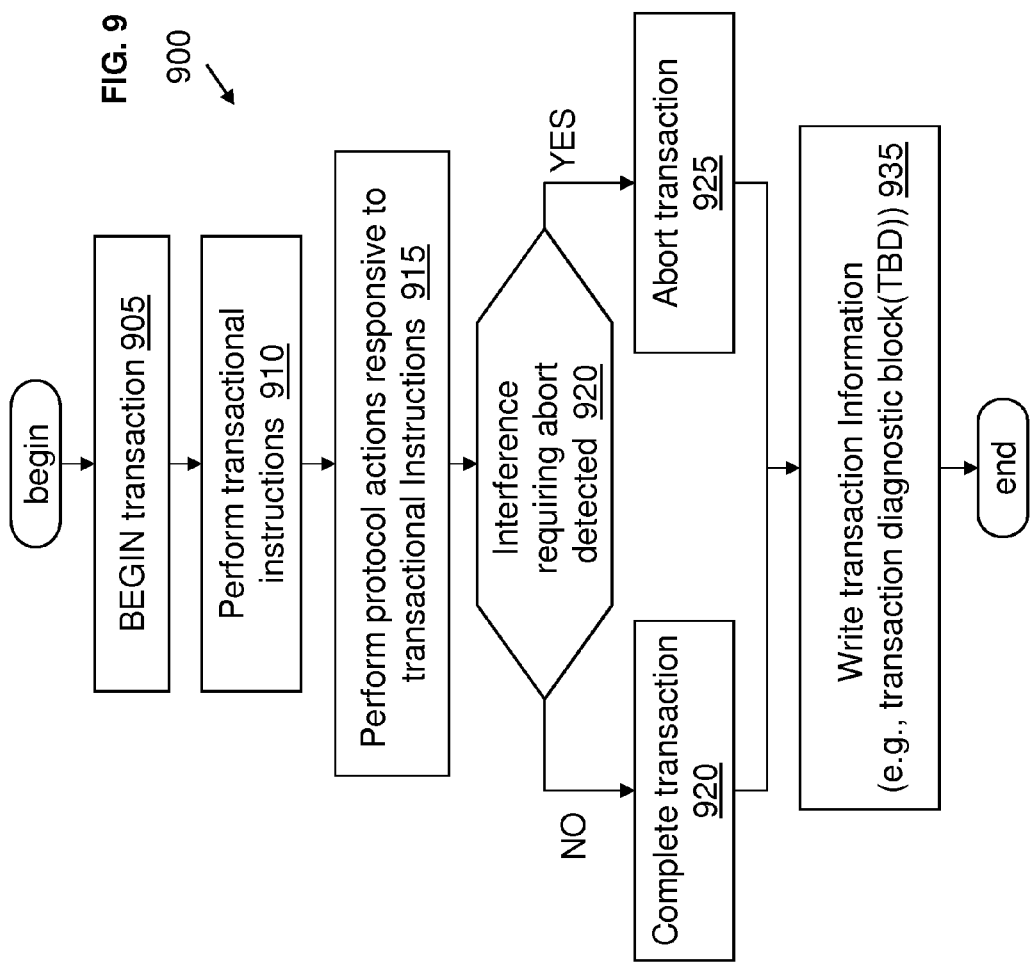
FIG. 9 depicts a flow diagram illustrating transaction handling by a processor in accordance with an embodiment.

FIG. 9 is a flow diagram 900 illustrating transaction handling by a processor according to an embodiment. At block 905, the transaction begins executing on the processor (e.g., CPU 1 or CPU 2). In FIG. 9, note that each processor (CPU 1 and CPU 2) may be performing these actions, i.e., transactions may be processed both by 112a, 112b and so forth. The processor performs the instructions within the transaction at block 910 (e.g., as discussed in FIG. 7). The processor performs protocol actions responsive to transactional instructions at block 915. The processor checks whether there is interference (with the use of the data) that requires the processor to abort its transaction at 920. When the processor determines (YES) there is interference detected, the processor aborts its own transaction (on the data) at block 925 and flow proceeds to block 935. When the processor determines NO interference is detected, the processor completes (the instructions of) its transaction at block 930. The processor writes transaction information (such as transaction diagnostic block (TBD)) in a register at block 935.

Figure 10:
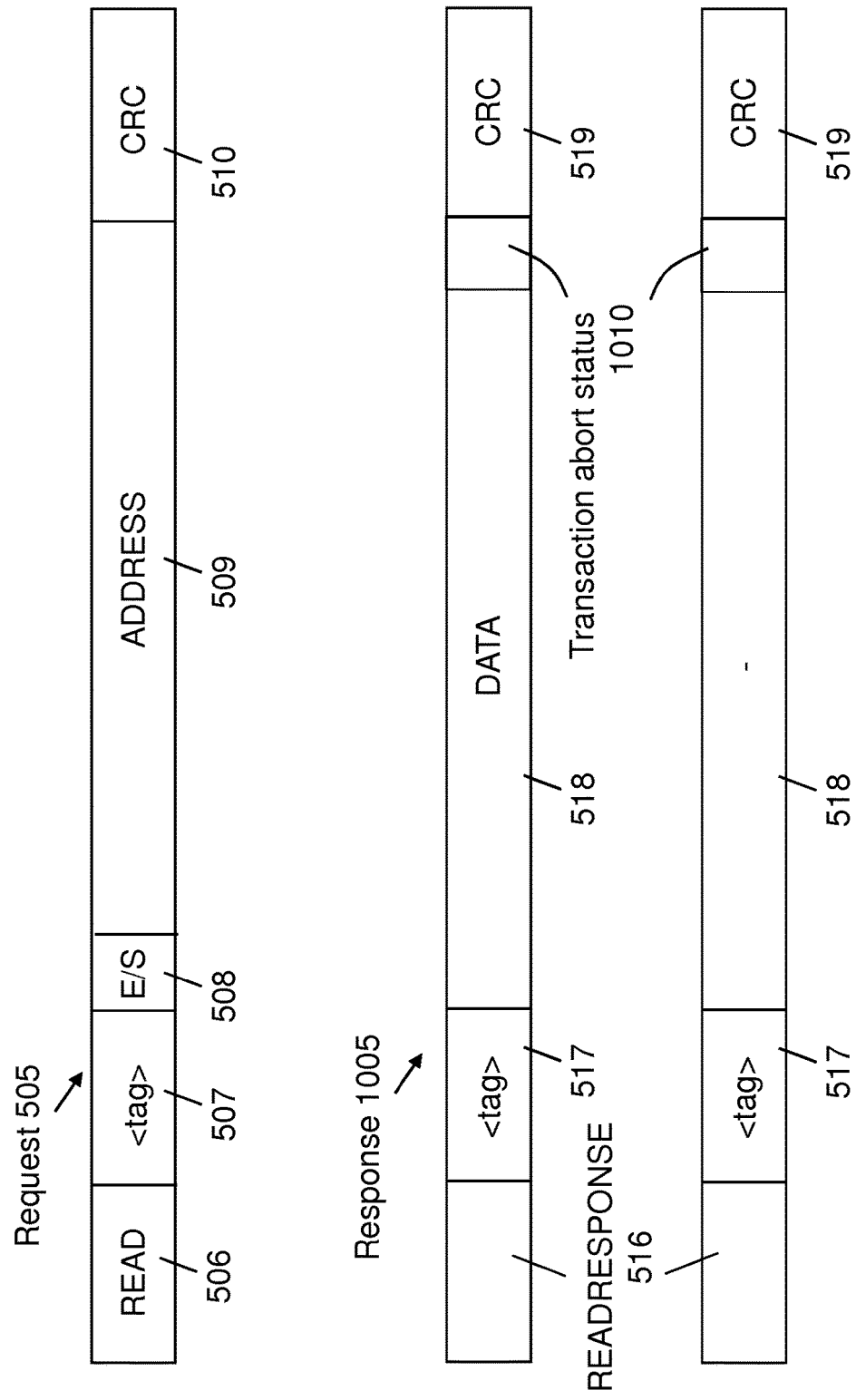
FIG. 10 depicts the protocol request and a new protocol response in accordance with an embodiment.

According to embodiments, the coherence protocol is extended to include additional information about the transaction status. FIG. 10 illustrates the protocol request 505 and a new protocol response 1005 according to embodiments. As shown in FIG. 10, some fields of the request 505 are identical to the fields discussed in FIG. 5. As noted above, the request 505 includes the type field 506 that identifies what type of request is being sent (e.g., READ), and the tag field 507 that identifies the particular processor (e.g., CPU 1) that sent the request (and optionally the receiving/remote processor, e.g., CPU 2 that the request is being sent to and a request number). The request 505 also includes the access field 508 that tells the type of access being requested by the requesting processor (CPU 1), and the address field 509 that tells the memory address of the cache line or address line being requested. The request 505 protocol include the error correction field 510 that tells the type of error code used such as cyclic redundancy check (CRC).

The new response 1005 includes the fields of the response 515 (in FIG. 5) along with an additional transaction abort status field 1010. The response 1005 may be sent back from the receiving/remote processor (CPU 2) to the requesting processor (CPU 1). The response 515 includes the type field 516 indicating the type of response, such as a read response (READRESPONSE), and the tag field 517 indicating (which may be the same tag as tag field 507 of the original request 505) the requested memory address of the cache line. The response 515 includes the data field 518 that is the requested data which was requested by the requesting processor (CPU 1). If data is not transmitted with a protocol response, then the data field 518 is empty or not present. The error detection/correction field 519 is included in the response 1005.

Additionally, the new protocol response 1005 (sent by the remote processor CPU 2 to the requesting processor CPU 1) has the transaction abort status field 1010. The transaction abort status field 1010 includes one or more of the following information about the transaction previously executing on the remote/receiving processor (CPU 2) before being aborted:

1) Whether the request 505 (from the requesting processor (CPU 1) caused and/or did not cause rollback (i.e., abort);

2) Priority of this transaction that was executing on the remote/receiving processor (CPU 2) before being aborted;

3) How many instructions, memory operations, and/or other measure of work had been performed by the transaction previously executing on the remote/receiving processor (CPU 2) before the transaction was aborted;

4) Identify the transaction (e.g., token, address of TBEGIN, and/or other means of identifying the aborted transaction) previously executing on the remote processor (CPU 2).

Furthermore, the transaction abort status field 1010 tells what data was obtained by the transaction (previously executing on the remote/receiving processor) that had to abort, tells the address of the transaction, and tells the cost of aborting the transaction (which might be 3 clock cycles or 20,000 clock cycles of work).

When a processor (e.g., receiving processor CPU 2 in example scenarios) is in transactional execution, a coherence request can cause the transactional execution to abort, e.g., because the data is part of the transaction read or write set, and a conflict (i.e., interference) is detected.

Figure 11:
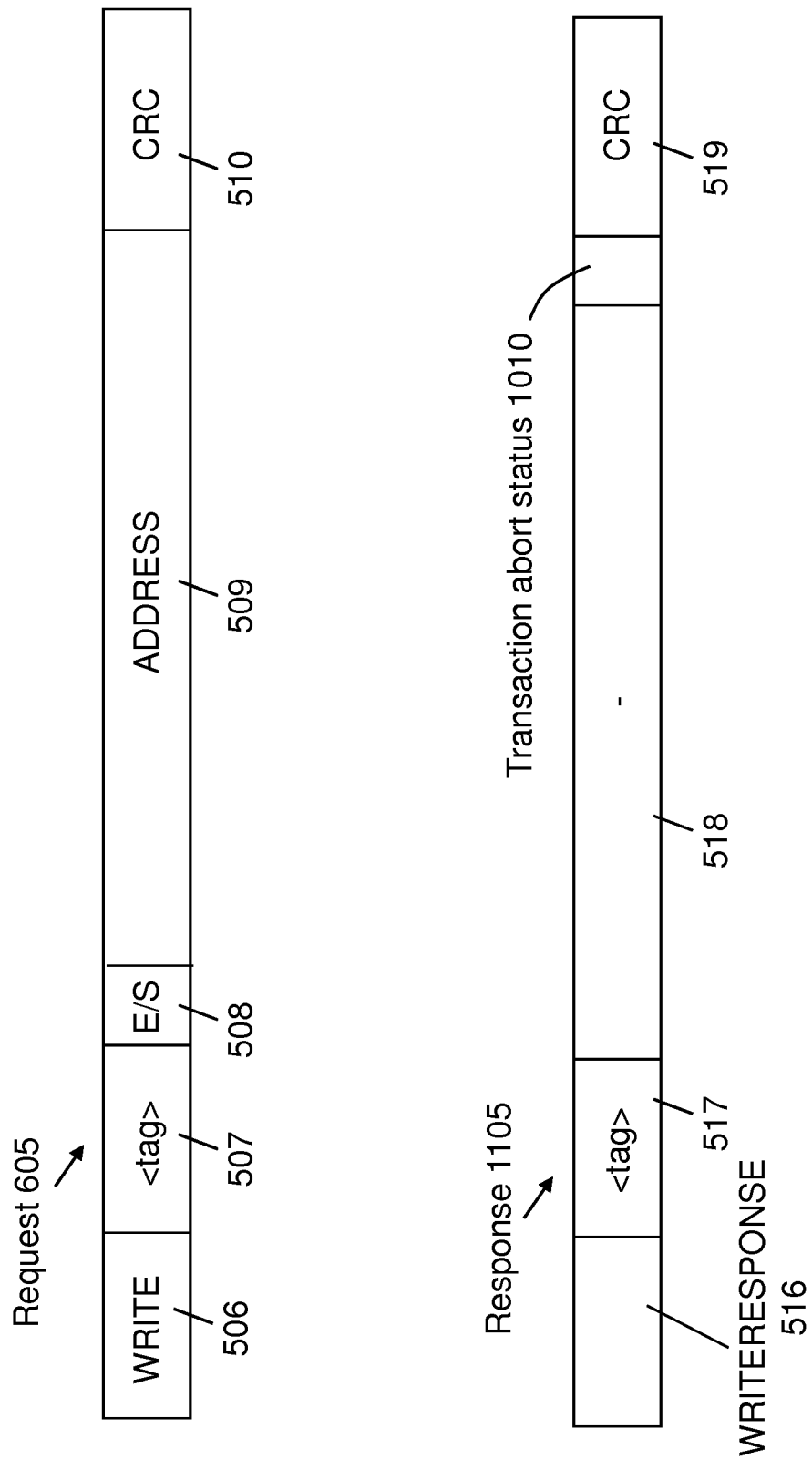
FIG. 11 depicts the protocol write request and a new response in accordance with an embodiment.

According to an embodiment, FIG. 11 illustrates the (write) request 605 in FIG. 6 to write data (sent from requesting processor CPU 1 (112*a*) to receiving/remote processor CPU 2 (112*b*)) and a new response 1105 is sent back to the requesting processor CPU 1 (112*a*) from the remote processor CPU 2 (112*b*). FIG. 11 is a protocol request and response example that adds transaction information in the response according to an embodiment by introducing a new protocol response to a transaction previously not requiring a protocol response in order to transmit transaction interference/abort information to the request originator. In at least one embodiment, the protocol response that is transmitted for the sole purpose of providing transaction abort status is optional and may be suppressed in some modes, in response to configuration bits, in response to bus congestion, and/or for other reasons. In such scenario when no response is received, no transaction abort status is reported corresponding to a request for which no response has been received. In at least one embodiment, an absence of one or more responses may be reported. As noted above, the request 605 includes the type field 506 that tells what type of request is being sent (e.g., write), and the tag field 507 that identifies the particular processor (e.g., CPU 1) that sent the write request (and the receiving processor, e.g., CPU 2 that the request is being sent to). The request 605 also includes the access field 508 that tells the type of access being requested by the requesting processor (CPU 1), and the address field 509. The address field 509 tells the memory address of the cache line or address line being requested for writing to. The request 605 protocol may include the error detection and/or correction field 510 with an error correction/detection code, such as parity bits, ECC or cyclic redundancy check (CRC) code.

In response to the write request 605, the new response 1105 (to the write request) now includes the transaction abort status field 1010 discussed herein. The new response 1105 includes the fields of the response 1005 (in FIG. 10). The response 1105 may be sent back from the receiving/remote processor (CPU 2) to the requesting processor (CPU 1). The response 1105 includes the type field 516 indicating the type of response, such as a write response (WRITERESPONSE), and the tag field 517 indicating (which may be the same tag as tag field 507 of the original request 505 to identify the request that the response corresponds to) the requested memory address of the cache line. The response 515 may include a data field 518 that is the requested data which was requested by the requesting processor (CPU 1). Since no data is being from the (local) cache of the receiving/remote processor (CPU 2), then the data field 518 is empty. The error correction field 519 is included in the response 1005.

As discussed herein, the transaction abort status field 1010 provides the status of the transaction (previously executing on the receiving/remote processor (CPU 2)) that was required to abort because of the write request 605 (from the requesting processor (CPU 1)).

While protocol enhancements in accordance with the present disclosure have been described in one exemplary embodiment in conjunction with adding a protocol field corresponding to a transaction abort status and associated information to an existing read response to a read request, and in another exemplary embodiment in conjunction with adding a protocol response corresponding to a protocol write request not having a protocol response in accordance to the state of the art in order to transmit at least one protocol field corresponding to a transaction abort status and associated information and identifying a corresponding write request, those skilled in the art will be able to apply the teachings contained herein to other XI formats, protocol formats, types of requests, coherence protocols and so forth.

Figure 12:
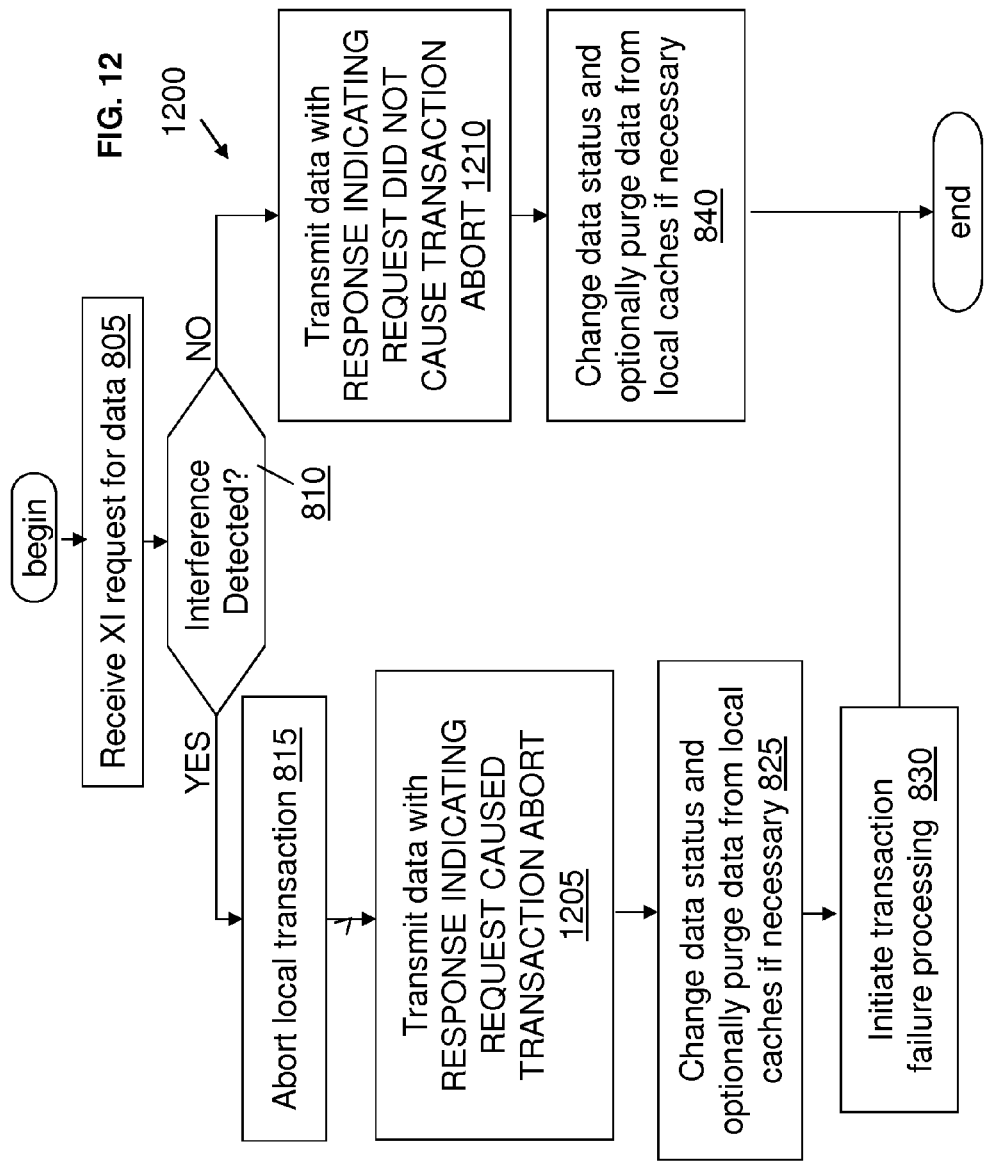
FIG. 12 depicts a flow chart illustrating coherence request handling by the receiving/remote processor that receives the request in accordance with an embodiment.

According to an embodiment, FIG. 12 is a flow chart 1200 illustrating coherence request handling, e.g., by the receiving/remote processor CPU 2 (112*b*) that receives the request from the requesting processor CPU 1 (112*a*). FIG. 12 includes the blocks of FIG. 8, along with new (modified) blocks 1205 and 1210 that comprise transmitting the transaction abort status (in transaction abort field 1010) as part of protocol responses.

In FIG. 12, the request handling by the receiving/remote processor (e.g., CPU 2 (112*b*)) receives the request according to an embodiment. The remote processor (CPU 2) receives the XI request (e.g., the request 505 and/or request 605) for data from the requesting processor (CPU 1) at block 805. At block 810, the remote processor (CPU 2) checks whether an interference is detected by checking if the remote processor is processing a transaction that makes reference to data in a manner incompatible with the received request, e.g., request 505 and 605. For example, in one exemplary embodiment, a read shared request is compatible with a reference to data in a transactions read set, but a write request is not. In addition, a read-exclusive, read escalation (i.e., change from shared to exclusive) or write request is not compatible with the same data referenced either in a transaction's read or write set. When the remote processor (CPU 2 (112*b*)) determines that remote processor (itself) is currently using the data requested by the requesting processor (CPU 1 (112*a*)) in block 810, the remote processor determines (YES) interference is detected and the remote processor (CPU 2) aborts the local transaction occurring at the remote processor (CPU 2) at block 815. Once the local transaction is aborted at the remote processor (CPU 2), the remote processor transmits the data with the read response (READ RESPONSE) to the requesting processor (CPU 1) along with the transaction status field 1010 (which notifies that the request caused the transaction (previously executing) to abort at the remote/receiving processor (CPU 2) in order to fulfill the request) at block 1205. In another embodiment, it may acknowledge a received write request with a write response 1105. In the state-of-the-art systems, no transaction status field 1010 would have been included in the response (RESPONSE) sent from the remote CPU 2 (that was previously executing its own transaction now aborted) back to the requesting CPU 1 (that sent the request 505 and/or 605). The remote processor (CPU 2) changes data status and optionally purges data from its local caches if necessary at block 825. The remote processor (CPU 1) initiates transaction failure processing at block 830 and the flow ends. When the remote processor (CPU 2 (112*b*)) determines that remote processor is not currently using the data requested by the requesting processor (CPU 1 (112*a*)) in block 810, the remote processor determines NO interference is detected and the remote processor (CPU 2) transmits the data with the read response (READ RESPONSE) along with the transaction status field 1010 (which indicates that the request did not cause a transaction to abort) at block 1210. The remote processor (CPU 2) changes data status and optionally purges data from local caches if necessary at block 840, and the flow ends.

Figure 13:
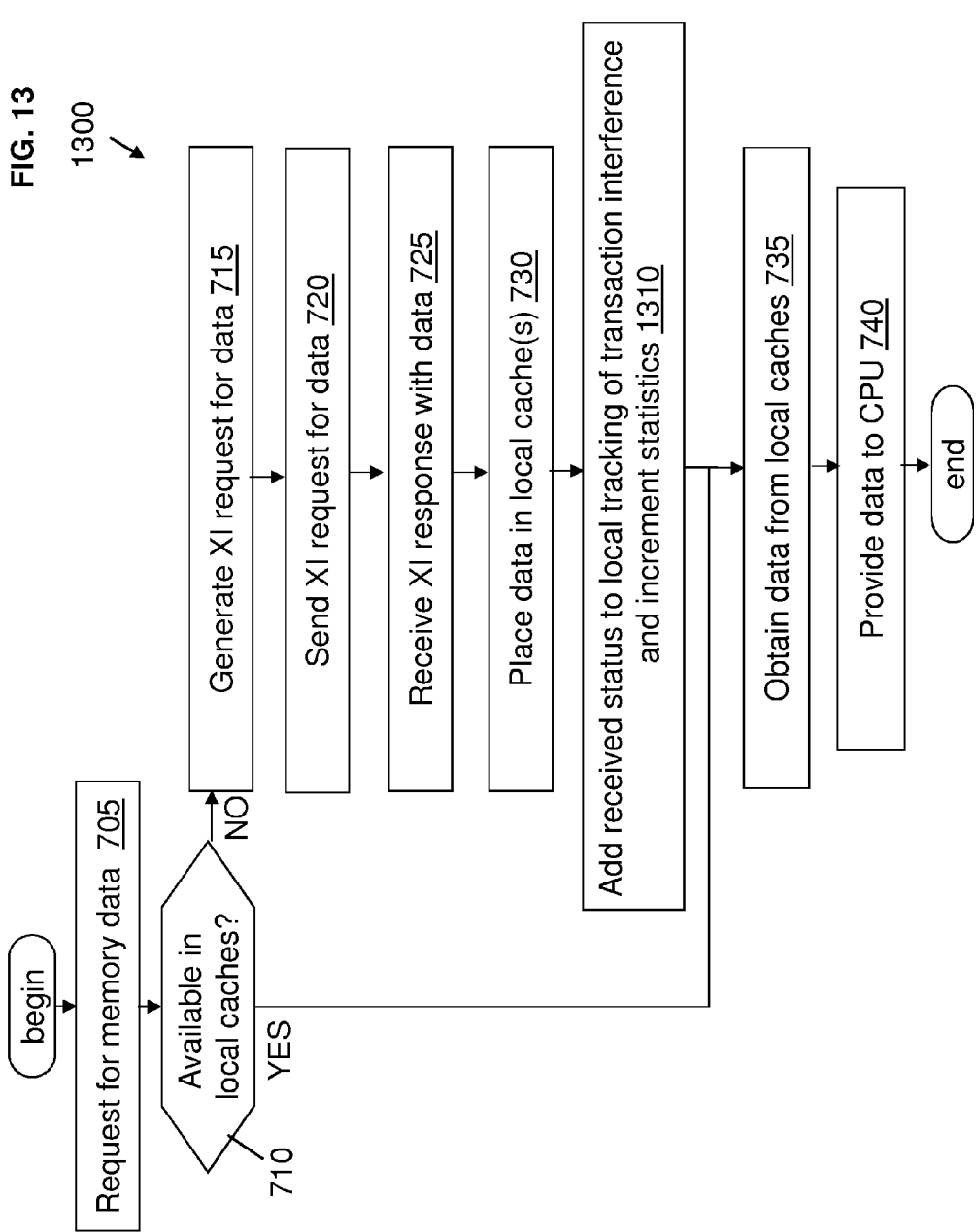
FIG. 13 depicts a flow diagram illustrating protocol request origination and processing by the requesting processor in accordance with an embodiment.

FIG. 13 is a flow diagram 1300 illustrating protocol request origination and processing by the requesting processor (CPU 1 (112*a*)) according to an embodiment. FIG. 13 includes the blocks discussed above in FIG. 7, and discussion of FIG. 7 is not repeated. Additionally, the flow diagram 1300 includes new blocks 1305 and 1310. For example, the requesting processor (CPU 1) receives the XI response with data from the remote processor (CPU 2) (block 725) along with the new transaction abort status field 1010 at block 1305. The requesting processor (CPU 1) places the data in local caches (such as the L1 and/or L2 caches) at block 730. At block 1310, the requesting processor (CPU 1) adds the received status (e.g., information in the transaction status field 1010) to a local transaction interference tracking table 1350*a* in the data cache 118*a* (and/or memory 310). The local transaction interference tracking table 1350*a* may be a storage location that keeps track of interference when the requesting processor (CPU 1) causes the interference (resulting in transaction abort at the remote processor (CPU 2)), and the local transaction interference tracking table 1350*a* may include a log of this information. The local tracking transaction interference (storage) table 1350*a* includes increment statistics and current transaction status. The increment statistics increase for each transaction abort (reported back to the receiving processor (CPU 1), and the increment statistics may be separated into shared/exclusive (R/W) requests and aggregated requests. Local tracking transaction interference storage table 1350*a* may include a counter that increments for each transaction abort caused by requesting processors (CPU 1) and for each time no transaction aborted at requesting processors (CPU 1). In some embodiments, transaction abort status received in conjunction with block 1310 may also be aggregated in a performance monitoring unit, a runtime instrumentation unit, and/or another performance tracking logic in order to make information available to dynamic optimizers, just in time (HT) compilers, or for performance tuning by programmers. Information may be recorded by logging in storage, in structures directed at performance monitoring, and/or by raising notifications, e.g., PMU event based branches in accordance with the Power ISA™, or exceptions. Reporting may include nature of interference, identification of the interfering and/or interfered transaction, processor IDs, addresses being the subject to such interference, and so forth.

As discussed herein, the coherence protocols use a number of bits—address, data, and status and control bits. These data are used to issue a data request, and to indicate its ownership (e.g., shared, exclusive) and status (e.g., dirty, clean). An additional one or more bits (for transaction abort status field 1010) are added to indicate that a request caused a transaction to abort and/or could cause a transaction to abort. For example, a status bit (transaction abort status field 1010) indicates that the requested data caused a conflict for the transactional execution, when the data was given up by the remote processor (CPU 1). As noted, a response to the request can come back with an indication that a transaction is in progress, and that the request caused a transaction to be aborted.

In one embodiment, additional metrics, such as number of instructions in an aborted transaction are transmitted in the transaction abort status field 1010. In one embodiment, indications are used to determine a holdoff, e.g., with respect to the restart of a transaction in case the winning transaction later becomes aborted and is restarted, to avoid livelock scenarios. The requesting processor (CPU 1) can also throttle (reduce) its request rate in response to aborting too many remote transactions to increase overall system throughput, when the requesting processor (CPU 1) determines that the requesting processor has caused too many (e.g., a predefined amount) transaction aborts in the remote/receiving processor (CPU 2) by checking the local transaction abort status field 1010.

In yet another embodiment, such notifications (in the transaction abort status field 1010) are gathered in logs and/or notified via a notification mechanism (e.g., an exception) to a dynamic reoptimization component; the dynamic reoptimization component can dynamically reoptimize code to reduce interference and/or generate alternate code to use locks in lieu of transactions.

Figure 14:
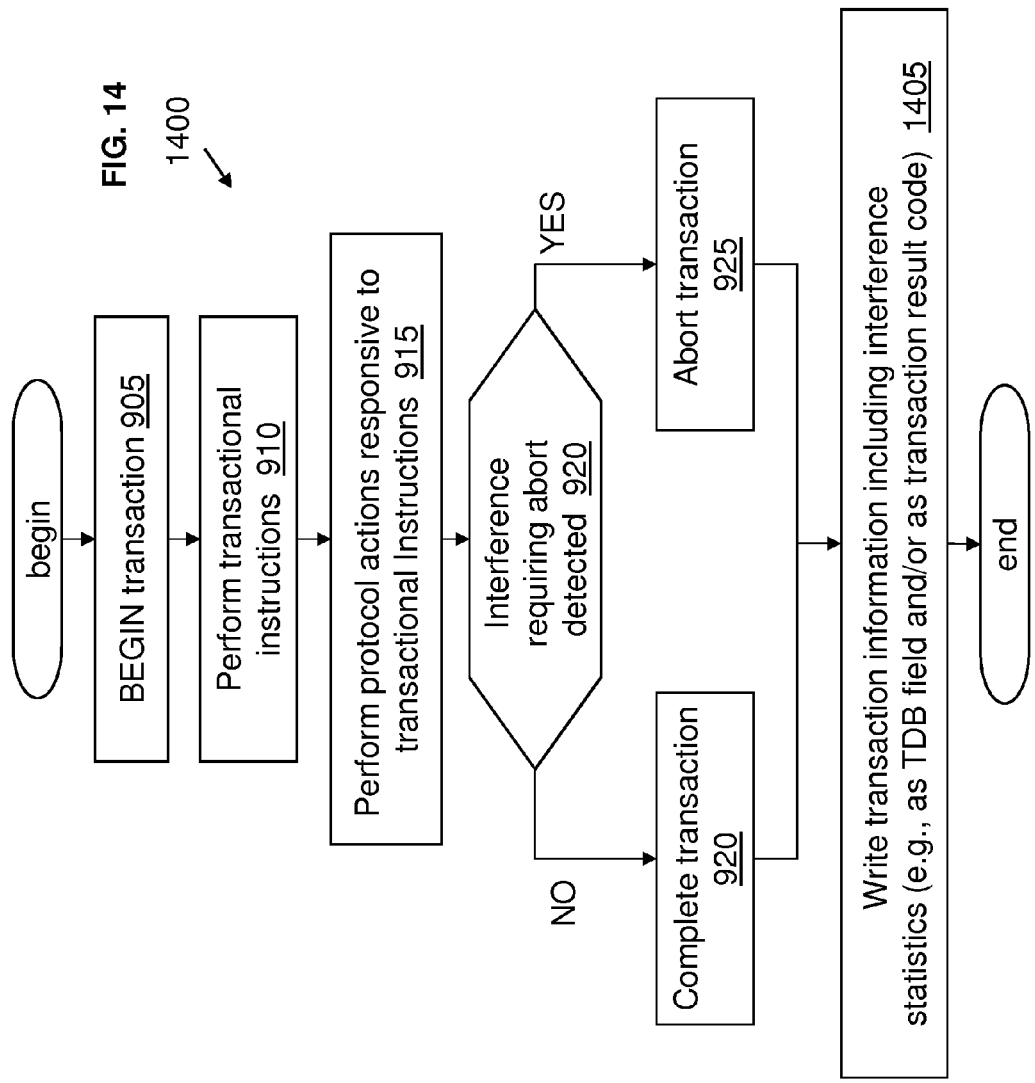
FIG. 14 depicts a flow diagram illustrating transaction handling by a processor in accordance with an embodiment.

Now, the blocks of FIG. 9 are included in FIG. 14 but their discussion is not repeated. FIG. 14 also includes a modification to FIG. 9. FIG. 14 is a flow diagram 1400 illustrating transaction handling by a processor according to an embodiment. It may be assumed that processor is the requesting processor (CPU 1). FIG. 14 includes the blocks of FIG. 9, along with block 1405. At block 1405, the requesting processor (CPU 1) writes transaction information (such as transaction diagnostic block (TBD)) including the transaction interference statistics (obtained from the new transaction abort status field 1010 and stored in the local tracking transaction interference storage table 1350*a*) in the register 334, cache 118*a*, and/or memory 310 at block 1405. In one embodiment, when a transaction completes, the transaction may include an indication whether it has caused one or more transactions to be aborted as part of a result code, e.g., a result register, result condition register, and so forth (e.g., in registers 334*a*, 334*b*). In one embodiment, when the transaction sets a result status in one or more registers (e.g., registers 334*a*, 334*b*) and/or memory locations, the one or more registers (e.g., in registers 334*a*, 334*b*) and/or memory locations (e.g., in memory 310, caches 118*a*, 118*b*) may include the number of transactions interfered with that were aborted to provide data to the transaction, the nature of the interference (read request with write set, or write request with either read or write, and so forth). In one embodiment, the information so stored may include specific information about each of the transactions, and including a way to identify a processor on which the interference occurred, a transaction having been aborted (e.g., by specifying the address of the transaction begin XBEGIN or TBEGIN, a token, a transaction ID, and so forth), a measure of work having been performed by that transaction prior to being aborted, and so forth. In one embodiment, when a state-of-the-art transaction diagnostic block is extended in accordance with the present disclosure to have additional fields corresponding to interference and transaction abort status, the information stored to one or more memory locations corresponds to memory locations of a transaction diagnostic block (TDB) in accordance, for example, with the z/Architecture (included herein by reference) and to fields of a transaction diagnostic block in accordance with the present disclosure, the fields corresponding to information transmitted individually by newly introduced protocol fields, and/or by aggregated information from a plurality of such fields. In another embodiment, the information stored in registers and/or memory locations is provided as distinct, separate and independent of a state-of-the-art TDB.

At block 1405, the requesting processor (CPU 1) is configured to provide the interference statistics via performance monitoring unit and/or runtime instrumentation unit to the programmer, and provide interference information to firmware, millicode, etc. In millicode, the millicode code can use the interference statistics information to avoid livelock and/or use the interference statistics information to optimize transaction restart. In an application, the application can use interference statistics information to avoid livelock and optimize transaction restart.

According to an embodiment, example code is provided below for explanation purposes.

The following pseudo code (executed on processors 112*a*, 112*b*) provides one form of performing transaction restart optimization (either transparently in millicode and/or by code integrated in an application running on the processor) in order to restart a transaction when the transaction has been aborted, and optimized in particular to avoid livelock scenarios. The exemplary code uses information stored in the TDB in an exemplary fashion, however those skilled in the art will be able to use information obtained from, including, but not limited to, memory locations (e.g., memory 310), registers 334*a*,334*b*, status codes, and/or a performance monitoring unit, runtime instrumentation unit, and so forth:

```
IF (this transaction was aborted){
    ACCESS TDB information
    IF (this transaction aborted another transaction){
        mutual_shootdown_detected <= TRUE;
        IF (mutual_shootdown_detected)
            avoid_livelock( );    // take actions to avoid live lock,
                                  // e.g., lower priority of present
                                  transaction;
                                  // wait for backoff period;
                                  // synchronize using locks;
                                  // and so forth
    }
}
```

In accordance with the exemplary code, the transaction restart code includes checks whether it has been aborted itself, and it in turn has aborted another transaction. In one embodiment, a possible livelock is diagnosed immediately. In another embodiment, a test is performed (not shown) if the present transaction and the interfered transaction are part of a cyclical interference graph (i.e., each transaction is either directly or indirectly aborting the other transaction). In one embodiment, when a mutual shootdown is diagnosed, interference avoidance actions are taken. In one embodiment, when a mutual shootdown is diagnosed, livelock avoidance actions are taken. In one embodiment, the interference avoidance actions are invoked by calling a function avoid_livelock( ). In some embodiments, these actions may comprise, but not be limited to, one or more of lower priority of present transaction; wait for backoff period; synchronize using locks; and so forth.

In another exemplary embodiment, the following pseudo code provides one form of performing transaction restart optimization (either transparently in millicode or by code integrated in an application running on the processor) in order to restart a transaction when it has been aborted, and optimized in particular to avoid livelock scenarios. The exemplary code uses information stored in the TDB in an exemplary fashion; however, those skilled in the art will be able to use information obtained from, including, but not limited to, memory locations, registers, status codes, or a performance monitoring unit, runtime instrumentation unit, and so forth. In the exemplary code, the transaction takes livelock prevention operations when it corresponds to a transaction having exceeded a threshold of (possibly) mutual shootdowns:

```
IF (this transaction was aborted){
    ACCESS TDB information
    IF (this transaction aborted another transaction){
        mutual_shootdown++;
        IF (mutual_shootdown > threshold)
            avoid_livelock( );    // take actions to avoid live lock,
                                  // e.g., lower priority of present
                                  transaction;
                                  // wait for backoff period;
                                  // synchronize using locks;
                                  // and so forth
    }
}
```

In accordance with the exemplary code, the transaction restart code includes checks whether the transaction has been aborted itself, and it in turn has aborted another transaction. In one embodiment, a possible livelock is diagnosed immediately. In another embodiment, a test is performed (not shown) if the present transaction and the interfered transaction are part of a cyclical interference graph (i.e., each transaction is either directly or indirectly aborting the other transaction). In one embodiment, when more than a threshold number of mutual shootdowns have been diagnosed (mutual_shootdown>threshold), interference avoidance actions are taken). In one embodiment, when more than a threshold number of mutual shootdowns have been diagnosed (mutual_shootdown>threshold), livelock avoidance actions are taken. In one embodiment, the interference avoidance actions are invoked by calling a function avoid_livelock( ). In some embodiments, these actions may comprise, but not be limited to, one or more of lower priority of present transaction; wait for backoff period; synchronize using locks; and so forth.

Restart optimization (either transparently in millicode or in application):

```
IF (this transaction was aborted){
    ACCESS TDB information
    IF (this transaction aborted another transaction){
        mutual_shootdown++;
        If ((mutual_shootdown > threshold) &&
        live_lock_loop_detected( ))
            avoid_livelock( );    // take actions to avoid live lock,
                                  // e.g., lower priority of present
                                  transaction;
                                  // wait for backoff period;
                                  // synchronize using locks;
                                  // and so forth
    }
}
```

In accordance with the exemplary code, the transaction restart code includes checking whether the transaction has been aborted itself, and it in turn has aborted another transaction. In one embodiment, a possible livelock is diagnosed immediately. In one embodiment, when more than a threshold number of mutual shootdowns have been diagnosed (mutual_shootdown>threshold), a test is performed live_lock_loop_detected( ) which may access additional information received via response abort status messages and optionally in conjunction with other means, if the present transaction and the interfered transaction are—or, in another embodiment, may be—part of a cyclical interference graph (i.e., each transaction is either directly or indirectly aborting the other transaction). If so, then livelock avoidance actions are taken. In one embodiment, the livelock avoidance actions are invoked by calling a function avoid_livelock( ). In some embodiments, these actions may comprise, but not be limited to, one or more of lower priority of present transaction; wait for backoff period; synchronize using locks; and so forth.

Figure 15:
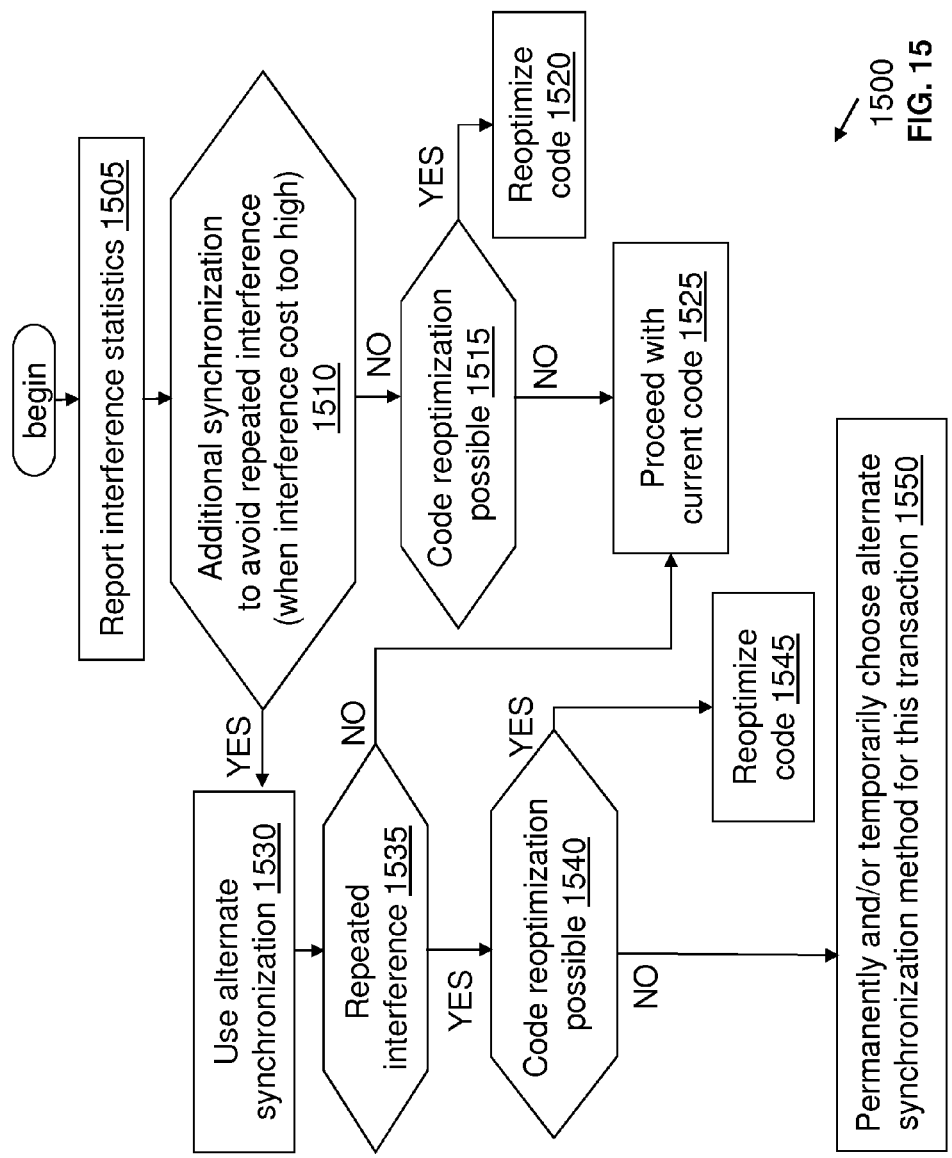
FIG. 15 depicts a flow diagram illustrating how the processor responds to interference indication in a local tracking transaction interference storage table in accordance with an embodiment.

According to an embodiment, FIG. 15 is a flow diagram 1500 illustrating how the processor (e.g., the requesting processor CPU 1) responds to interference indication, e.g., stored (and incremented/tracked) in the local tracking transaction interference storage table 1350*a* from the information in the transaction abort status field 1010. The requesting processor (CPU 1) reports the interference statistics at block 1505. Reporting the interference statistics may include writing the transaction information as discussed in block 1405. At block 1510, the requesting processor (CPU 1) determines whether additional synchronization is possible to avoid repeated interference by determining when the interference cost is too high. The interference cost is too high when the requesting processor (CPU 1) repeatedly aborts the (same) transaction executing on the receiving/remote processor (CPU 2) a predefined number of times (e.g., 4) and/or the transaction has completed a predefined number of clock cycles (e.g., 10,000 clock cycles) of instructions before being aborted.

When the requesting processor (CPU 1) determines that the additional synchronization is not possible to avoid repeated interference (repeated transaction aborts on the remote processor (CPU 2) caused by the request for data from the requesting processor (CPU 1) in block 1510, the requesting processor (CPU 1) checks whether code reoptimization is possible at block 1515. When the requesting processor (CPU 1) determines that reoptimization is possible, the requesting processor reoptimizes the code at block 1520. When the requesting processor (CPU 1) determines that reoptimization is not possible, the requesting processor proceeds with current code (including toleration measures such as backoff) at block 1525. Backoff is when the requesting processor determines to wait a predefined amount of time before make the request for data, in order for the receiving/remote processor (CPU 2) to have time for the transaction of the receiving/remote processor to complete execution (without having to abort).

When the requesting processor (CPU 1) determines that the additional synchronization is possible to avoid repeated interference (repeated transaction aborts on the remote processor (CPU 2) caused by the request for data from the requesting processor (CPU 1) in block 1510, the requesting processor (CPU 1) utilizes alternate synchronization at block 1530. The requesting processor (CPU 1) checks, e.g., the log in the local tracking transaction interference storage table 1350*a* to determine when repeated interference (of the same transaction (i.e., having the same cache/memory address) has occurred on the remote/receiving processor (CPU 2) at block 1535. When there is not repeated interference, the flow proceeds to block 1525. When the requesting processor (CPU 1) determines that there is repeated interference (for the same aborted transaction on the remote/receiving processor (CPU 2)), the requesting processor checks whether code reoptimization is possible at block 1540. When reoptimization is possible, the requesting processor (CPU 1) reoptimizes the code at block 1545.

When the requesting processor (CPU 1) determines that code reoptimization is not possible, the requesting processor (CPU 1) is configured to permanently (and/or for a defined period) choose alternate synchronization method for this particular transaction (executing on the requesting processor (CPU 1)) requesting data from the receiving/remote processor (CPU 2) at block 1550.

According to an embodiment, FIG. 16 is a flow diagram 1600 illustrating how the processor (e.g., the requesting processor CPU 1) responds to interference indication, e.g., stored (and incremented/tracked) in the local tracking transaction interference storage table 1350*a* from the information in the transaction abort status field 1010. FIG. 16 includes the blocks of FIG. 15, except block 1605 replaces block 1540. The blocks of FIG. 15 are not repeated.

When block 1535 is YES, the flow proceeds to block 1605 in FIG. 16. At block 1605, the requesting processor (CPU 1) checks whether reoptimization or alternative synchronization is preferable. When the determination in block 1605 is YES, the flow proceeds to block 1545. When the determination in block 1605 is NO, the flow proceeds to block 1550. In block 1540 of FIG. 15, when code reoptimization is possible, code reoptimization is always performed. In 1605, a metric is computed to determine whether code reoptimization or an alternate synchronization method (e.g., locks) is desired, and one or the other is selected. This may be based, for example, on a test comparing the aggregate cost of using an alternate synchronization methods with the cost of using reoptimized cost plus the cost of performing reoptimization, to determine which one is desired. Other cost metrics are possible and contemplated by the present disclosure, such as minimizing the cost of reoptimization overhead, e.g., by comparing reoptimization cost with a threshold.

FIG. 17 is a flow chart 1700 of a method (executed by the processors 112*a*, 112*b*) for implementing a coherence protocol according to an embodiment.

At block 1705, the requesting processor 112*a* (CPU 1) sends a request (such as requests 505, 605) for data to the remote processor 112*b* (CPU2) via interconnect 122. At block 1710, the requesting processor 112*a* (CPU 1) receives a response (such as responses 1005, 1105) from the remote processor 112*b*, in which the response including the transaction status (e.g., transaction abort status 1010) of a remote transaction (e.g., transaction 320*b*) on the remote processor 112*b*. At block 1715, the requesting processor 112*a* adds the transaction status (information from field 1010) of the remote transaction on the remote processor in a local transaction interference tracking table (e.g., table 1350*a*).

In addition to one or more of the features described above, or as an alternative, further embodiments can include wherein the transaction status of the remote transaction is added to a transaction diagnostic block (TBD) (by the requesting processor 112*a*). The remote transaction executes on the remote processor 112*b* and aborts execution based on sending the request for data to the remote processor. The request is by a requesting transaction (e.g., transaction 320*a*) executing on the requesting processor 112*a* sending the request.

In addition to one or more of the features described above, or as an alternative, further embodiments can include wherein based on the request by the requesting transaction causing the remote transaction (e.g., transaction 320*b*) to abort on the remote processor 112*b*, the requesting processor 112a adds the transaction status of the remote transaction (obtained from field 1010) to the local transaction interference tracking table 1350a and increments a count of transaction aborts having occurred for the remote transaction (each particular transaction 320b that aborts).

In addition to one or more of the features described above, or as an alternative, further embodiments can include wherein the transaction status of the remote transaction, received by the requesting processor 112a in the response 1005, 1105 from the remote processor 112b, indicates that the remote transaction (transaction 320b) had to abort based on receiving the request 505, 605 from the requesting processor 112a.

In addition to one or more of the features described above, or as an alternative, further embodiments can include wherein the local transaction interference tracking table 1350a maintains a number of transactions that have been interfered with and aborted by the requesting transaction 320a executing on the requesting processor 112a. The local transaction interference tracking table 1350a maintains information describing remote transactions 320b on remote processors 112b (and other processors). The information describing the remote transactions 320b on the remote processors 112a includes at least one of: a type of interference caused by the requesting transaction executing on the processor, an identification or address of each of the remote transactions that were aborted by the requesting transaction, an identification of each of the remote processors on which the interference occurred, an address of each of the remote transactions having been aborted, and/or a measure of work having been performed by each of the remote transactions prior to being aborted.

Technical effects and benefits include a coherence protocol extended to include additional information about the transaction status. When a processor is in transactional execution, a coherence request can cause the receiving processor's transaction execution to abort because a conflict is detected. The coherence protocol request is extended with additional information that the receiving processor has aborted its transactional execution according to embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Referring now to FIG. 18, a computer program product 1800 in accordance with an embodiment that includes a computer readable storage medium 1802 and program instructions 1804 is generally shown.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system for implementing a coherence protocol, the system comprising:
a memory; and
a processor, communicatively coupled to said memory, the computer system configured to perform a method comprising:
sending a request for data to a remote processor;
receiving, by the processor, a response from the remote processor, the response including a transaction status of a remote transaction on the remote processor, wherein the transaction status received in the response from the remote processor includes: a type of interference at the remote processor caused by a requesting transaction executing on the processor, a number of clock cycles of work having been performed by the remote transaction prior to being aborted on the remote processor, and an indication of whether a rollback was caused on the remote processor by sending the request to the remote processor; and
adding, by the processor, the transaction status of the remote transaction on the remote processor in a local transaction interference tracking table;
wherein the processor is a separate processor from the remote processor.

2. The system of claim 1, wherein the transaction status of the remote transaction is added to a transaction diagnostic block.

3. The system of claim 1, wherein the remote transaction executes on the remote processor and aborts execution based on the sending the request for data to the remote processor.

4. The system of claim 1, wherein the request is by a requesting transaction executing on the processor sending the request.

5. The system of claim 1, wherein based on the request by the requesting transaction causing the remote transaction to abort on the remote processor, the processor adds the transaction status of the remote transaction to the local transaction interference tracking table and increments a count of transaction aborts having occurred for the remote transaction.

6. The system of claim 1, wherein the transaction status of the remote transaction, received by the processor in the response from the remote processor, indicates that the remote transaction had to abort based on receiving the request from the processor.

7. The system of claim 1, wherein the local transaction interference tracking table maintains a number of transactions that have been interfered with and aborted by the requesting transaction executing on the processor.

* * * * *